(12) United States Patent
Gillet et al.

(10) Patent No.: US 9,672,398 B2
(45) Date of Patent: Jun. 6, 2017

(54) AIMING IMAGERS

(71) Applicant: Intermec IP Corporation, Fort Mill, SC (US)

(72) Inventors: Alain Gillet, Toulouse (FR); Serge Thuries, Saint Jean (FR)

(73) Assignee: Intermec IP Corporation, Fort Mill, SC (US)

( * ) Notice: Subject to any disclaimer, the term of this patent is extended or adjusted under 35 U.S.C. 154(b) by 0 days.

(21) Appl. No.: 14/881,263

(22) Filed: Oct. 13, 2015

(65) Prior Publication Data

US 2016/0026838 A1 Jan. 28, 2016

Related U.S. Application Data

(63) Continuation-in-part of application No. 14/465,036, filed on Aug. 21, 2014, now Pat. No. 9,400,906.

(60) Provisional application No. 61/870,063, filed on Aug. 26, 2013.

(51) Int. Cl.
*G06K 7/10* (2006.01)
*G02B 26/10* (2006.01)

(52) U.S. Cl.
CPC ....... *G06K 7/10732* (2013.01); *G02B 26/101* (2013.01); *G06K 7/10831* (2013.01); *G06K 2207/1011* (2013.01)

(58) Field of Classification Search
USPC ................ 235/454, 462.21, 462.41
See application file for complete search history.

(56) References Cited

U.S. PATENT DOCUMENTS 5,250,791 A * 10/1993 Heiman ............. G06K 7/10633
235/462.21
5,754,298 A * 5/1998 Falk .................... G01R 31/311
356/343
6,119,939 A 9/2000 Schwartz et al.
(Continued)

FOREIGN PATENT DOCUMENTS

WO 2013163789 A1 11/2013
WO 2013173985 A1 11/2013
(Continued)

OTHER PUBLICATIONS

U.S. Appl. No. 13/367,978, filed Feb. 7, 2012, (Feng et al.); now abandoned.
(Continued)

*Primary Examiner* — Allyson Trail
(74) *Attorney, Agent, or Firm* — Additon, Higgins & Pendleton, P.A.

(57) ABSTRACT

A scanner system is operable for gathering graphic data from a scan target. The scanner system has a single illumination source component operable for generating light, for aiming the scanner system with a filtered beam of the generated light directed at the scan target, and for illuminating the scan target with the directed light. The scanner system also has a detector component operable for sensing a reflection from the scan target, the sensed reflection including a portion of the directed light with which the scan target is illuminated, and for detecting information in the sensed reflection, in which the information detected in sensed reflection corresponds to the graphic data gathered from the scan target.

19 Claims, 12 Drawing Sheets

(56) References Cited

U.S. PATENT DOCUMENTS

| | | | |
|---|---|---|---|
| 6,454,167 B1 * | 9/2002 | Barkan | G02B 7/32 235/462.01 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,256,680 B2 | 9/2012 | Lawson et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,517,272 B1 | 8/2013 | Evans et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |
| 8,910,875 B2 | 12/2014 | Ren et al. | |
| 8,914,290 B2 | 12/2014 | Hendrickson et al. | |
| 8,914,788 B2 | 12/2014 | Pettinelli et al. | |
| 8,915,439 B2 | 12/2014 | Feng et al. | |
| 8,915,444 B2 | 12/2014 | Havens et al. | |
| 8,916,789 B2 | 12/2014 | Woodburn | |
| 8,918,250 B2 | 12/2014 | Hollifield | |

(56) References Cited

U.S. PATENT DOCUMENTS

| | | |
|---|---|---|
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,400,906 B2 | 7/2016 | Thuries et al. |
| 2002/0117547 A1* | 8/2002 | Krichever .......... G06K 7/10811 |
| | | 235/462.01 |
| 2005/0274806 A1 | 12/2005 | Dant |
| 2006/0113389 A1 | 6/2006 | Barkan |
| 2007/0063048 A1 | 3/2007 | Havens et al. |
| 2007/0095916 A1* | 5/2007 | Joseph ................ G06K 7/10732 |
| | | 235/454 |
| 2009/0057413 A1 | 3/2009 | Vinogradov et al. |
| 2009/0084847 A1 | 4/2009 | He et al. |
| 2009/0088203 A1 | 4/2009 | Havens et al. |
| 2009/0134221 A1 | 5/2009 | Zhu et al. |
| 2009/0319644 A1* | 12/2009 | Fagioli ................ H04W 76/02 |
| | | 709/221 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0193429 A1 | 8/2012 | Van Volkinburg et al. |
| 2012/0203647 A1 | 8/2012 | Smith |
| 2012/0223141 A1 | 9/2012 | Good et al. |
| 2012/0298755 A1 | 11/2012 | Lu et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0320092 A1 | 12/2013 | Bremer et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |

(56) References Cited

U.S. PATENT DOCUMENTS

| | | |
|---|---|---|
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0097035 A1 | 4/2015 | Duan et al. |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 14/462,801 for Mobile Computing Device With Data Cognition Software, filed Aug. 19, 2014 (Todeschini et al.); 38 pages.

U.S. Appl. No. 14/596,757 for System and Method for Detecting Barcode Printing Errors filed Jan. 14, 2015 (Ackley); 41 pages.

U.S. Appl. No. 14/277,337 for Multipurpose Optical Reader, filed May 14, 2014 (Jovanovski et al.); 59 pages.

U.S. Appl. No. 14/200,405 for Indicia Reader for Size-Limited Applications filed Mar. 7, 2014 (Feng et al.); 42 pages.

U.S. Appl. No. 14/662,922 for Multifunction Point of Sale System filed Mar. 19, 2015 (Van Horn et al.); 41 pages.

U.S. Appl. No. 14/446,391 for Multifunction Point of Sale Apparatus With Optical Signature Capture filed Jul. 30, 2014 (Good et al.); 37 pages.

U.S. Appl. No. 29/528,165 for In-Counter Barcode Scanner filed May 27, 2015 (Oberpriller et al.); 13 pages.

U.S. Appl. No. 29/528,890 for Mobile Computer Housing filed Jun. 2, 2015 (Fitch et al.); 61 pages.

U.S. Appl. No. 14/614,796 for Cargo Apportionment Techniques filed Feb. 5, 2015 (Morton et al.); 56 pages.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 14/578,627 for Safety System and Method filed Dec. 22, 2014 (Ackley et al.); 32 pages.

U.S. Appl. No. 14/573,022 for Dynamic Diagnostic Indicator Generation filed Dec. 17, 2014 (Goldsmith); 43 pages.

U.S. Appl. No. 14/529,857 for Barcode Reader With Security Features filed Oct. 31, 2014 (Todeschini et al.); 32 pages.

(56) References Cited

OTHER PUBLICATIONS

U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader, filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.

U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Heil); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Bamdringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
United Kingdom Combined Search and Examination Report in related Application No. GB1616508.6, Dated Mar. 15, 2017, 8 pages.

* cited by examiner

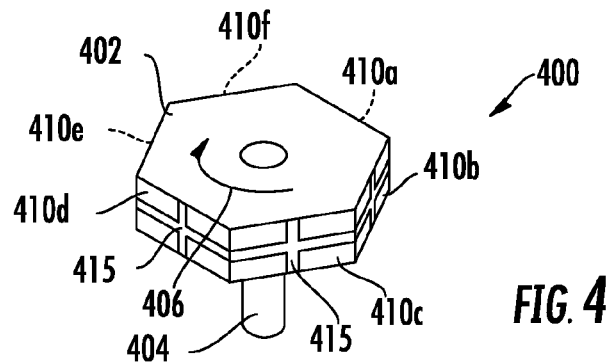
FIG. 4
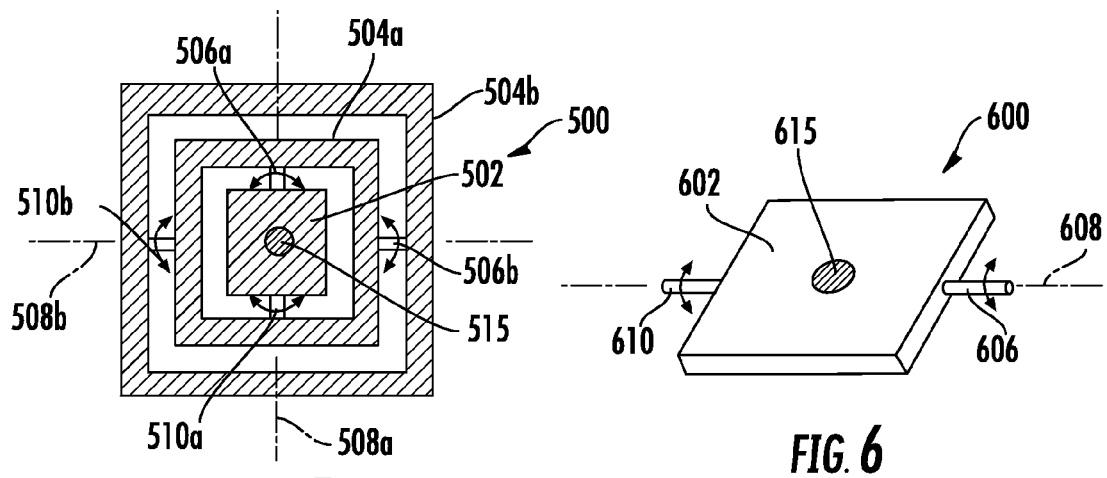
FIG. 5
FIG. 6
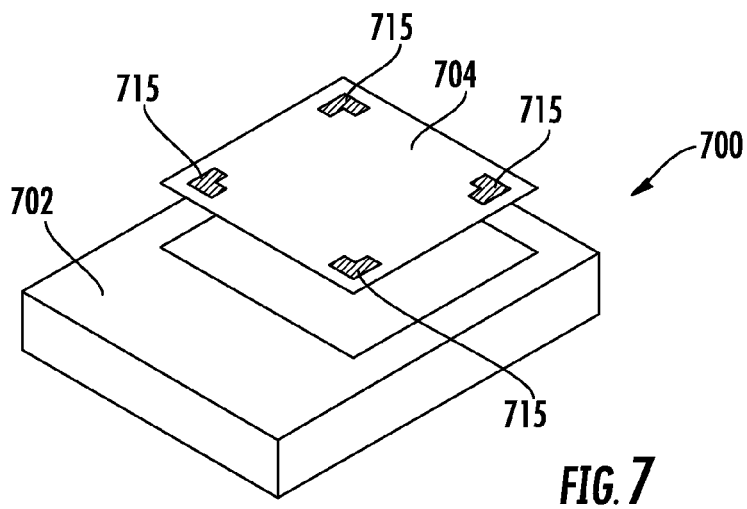
FIG. 7

AIMING IMAGERS

CROSS-REFERENCE TO RELATED U.S. APPLICATIONS

The present application is a Continuation-in-Part of U.S. patent application Ser. No. 14/465,036 for an Automatic Data Collection Apparatus and Method filed Aug. 21, 2014 (and published on Feb. 26, 2014 as U.S. Patent Application Publication No. 2015/0053769), which claims the benefit of U.S. Patent Application No. 61/870,063 for an Automatic Data Collection Apparatus and Method filed Aug. 26, 2013. Each of the foregoing patent applications and patent publication is hereby incorporated by reference in its entirety.

BACKGROUND

Technical Field

This disclosure generally relates to automatic data collection, in particular to readers and engines to optically read machine-readable symbols, for instance, linear or one-dimensional barcode symbols or two-dimensional area or matrix or stacked code symbols.

Description of the Related Art

Various types of readers are employed for reading machine-readable symbols, for instance, linear or one-dimensional barcode symbols or two-dimensional area or matrix or stacked code symbols. Some readers are fixed, for example, those found at grocery stores, supermarkets or other retail establishments, typically at the end of a conveyor belt. Some are portable, for example, handheld readers, typically found in warehouses and office environments. The handheld readers have housings, often with a rectangular shape or shaped as a pistol. The reader may be integrated into a terminal or other device, for instance, with various user input and/or output structures. User input structures may take the form of keypads, keyboards, buttons, user selectable icons, joysticks, thumb sticks, and/or microphones. User output devices may take the form of display screens (e.g., liquid crystal, organic liquid crystal), light emitting diodes, and/or speakers. Readers also typically include one or more communications systems to provide communications with external devices or systems. The communications systems may take the form of one or more radios and associated antennas. For instance, a reader may include a short range wireless radio, for example, one compliant with either BLUETOOTH or WI-FI standards and protocols. Additionally or alternatively, the reader may have a longer range wireless radio, for instance, a radio that is compliant with a cellular communications system or network standard and/or protocol. The reader may additionally include one or more wired communications ports, for instance, a Universal Serial Bus® (USB) port, an Ethernet® port, a Firewire® port, and/or Thunderbolt® port.

Automatic data collection devices such as machine-readable symbol readers typically take one of two types, flood illumination systems or scanning spot based systems. Flood illumination systems either provide flood illumination of a target or rely on ambient lighting and capture an image (one- or two-dimensional) of the target. In contrast, scanning based systems sequentially scan a spot or point of light across a target, and produce a scan profile indicative of a magnitude of light returned from the target. The size of the spot is typically small, in order to provide sufficient resolution to read the machine-readable symbol, which is typically made up of patterns of two colors (e.g., black, white) although multi-color machine-readable symbols have been employed.

The machine-readable symbol reader may include one or more illumination or light sources to generate the flood illumination or the scanning spot. For example, the machine-readable symbol reader may include one or more light emitting diodes (e.g., LEDs) or one or more lasers (e.g., laser diodes). Laser light is collimated and coherent, advantageously keeping spot size relatively small over relatively long distances (e.g., 1-3 meters). Machine-readable symbol readers typically include one or more optical components, for example, lenses, mirrors, reflectors, prisms, dichroic mirrors. Scanning spot machine-readable symbol readers typically include one or more moving optical components to scan the light spot or beam in a defined pattern (e.g., raster scan pattern, Lissajous scan pattern). For instance, a scanning spot machine-readable symbol reader may include a rotating polygonal mirror or reflector, or a pivoting mirror or reflector. Pivoting mirrors or reflectors may pivot about one axis or two axes (e.g., perpendicular or orthogonal axes) to produce a desired scan pattern.

The machine-readable symbol reader may include one or more detectors which are responsive to light returned to the machine-readable symbol reader from the target. Detectors may, for example, include photodiodes, photosensors, CMOS optical sensors, or one- or two-dimensional arrays of charged coupled devices (CCDs), Vidicons, etc.

Often one or more of the illumination or light sources, moving optical components, if any, detectors and other optics (e.g., lenses, mirrors, reflectors, prisms, dichroic mirrors) are packaged in a unit commonly referred to as a scan engine. In use the scan engine may, for example, mount to a printed circuit board, for instance, a decode board which carries circuitry that decodes a scan pattern produced by the detectors. While denominated as a scan engine, such are not limited to scanning spot type machine-readable symbol readers, and the term scan engine as used herein and in the claims is not intended to be limited to scanning spot type machine-readable symbol readers.

Light leaving the reader is typically not visible as it passes through the environment (e.g., air), and may or may not be visible when striking the target. Consequently, some machine-readable symbol readers include an aiming beam mechanism, which projects an aiming beam which forms a visible pattern on the target. Such may facilitate aiming or orienting the machine-readable symbol reader with respect to the target or a position on the target. The aiming beam mechanism typically includes dedicated illumination or light sources, which is, or are, separate and distinct from the illumination or light sources that produce the scanning spot or beam. For example, the aiming beam may employ a different color light than the scanning spot or beam.

Often, the aiming beam mechanism is packaged as part of the scan engine. The size of the scan engine disadvantageously limits on how small the machine-reader imager may be made. An alternative approach that allows smaller scan engines, and hence smaller machine-readable symbol readers, is desirable.

SUMMARY

A scanner apparatus may be summarized as including at least one illumination transducer electrically coupleable to a source of electrical power and selectively operable to emit illumination outwardly along a first optical path; and at least a first optical element positioned in the first optical path that extends outwardly from the illumination transducer, the first optical element being subtractive, that is, having a pattern that substantially blocks a portion of the illumination emitted by the illumination transducer to form an aiming pattern.

The first optical element may be at least one of a lens, a transparent cover, a filter, a reflector or a prism. The first optical element may include a mask that forms the pattern. The pattern may be a spectral filter that substantially blocks a first set of wavelengths and substantially passes a second set of wavelengths to produce the aiming pattern of a defined color. The scanner apparatus may be a scan engine sized and configured to be incorporated into a machine-readable symbol reader. The first optical element may be a reflector rotatably mounted to rotate or pivotally oscillate about an axis, the reflector positioned in the first optical path to scan the illumination emitted by the at least one illumination transducer. The reflector may be one of a polygonal mirror mounted to rotate about the axis or a flat mirror mounted to pivotally oscillate about the axis, the polygonal or the flat mirror having a mask that substantially does not reflect the illumination from some portions of the polygonal or the flat mirror and substantially reflects the illumination from other portions of the polygonal or the flat mirror. The scanner apparatus may further include a reflector rotatably mounted to rotate or pivotally oscillate about an axis, the reflector positioned in the first optical path to scan the illumination emitted by the at least one illumination transducer. The scanner apparatus may be a scan engine sized and configured to be incorporated into a handheld machine-readable symbol reader. The scanner apparatus may further include at least one illumination responsive detector positioned relative to the at least one illumination transducer to detect illumination emitted therefrom along the first optical path after returning from an object along a second optical path. The second optical path may not extend through the first optical element. The scanner apparatus may further include a housing having an interior and at least a first window providing optical communication between the interior and exterior of the housing, the at least one illumination transducer and the detector each received in the interior of the housing, at least the first optical path extending through the first window. The housing may include a second window including at least one of a lens or a transparent cover, the second optical path extending through the second window. The at least one illumination transducer may consist of a single laser diode, and may further include: the source of electrical power; and at least one switch operable to selectively electrically couple the electrical power to the illumination transducer. The aiming pattern may be concentric with an illumination field emitted by the illumination transducer. The aiming pattern and an illumination field emitted by the illumination transducer may each have at least one axis of symmetry in common with one another.

A scanner apparatus may be summarized as including at least one illumination transducer electrically coupleable to a source of electrical power and selectively operable to emit illumination outwardly along a first optical path as an illumination field; and an optical element positioned in the first optical path that extends outwardly from the illumination transducer, the illumination field including an aiming pattern in the form of an absence of illumination in one or more portions of the illumination field.

The optical element may include a spectral filter that substantially blocks a first set of wavelengths and substantially passes a second set of wavelengths to produce the aiming pattern of a defined color. The spectral filter may have a defined spatial shape. The optical element may have a mask pattern that substantially blocks a portion of the illumination emitted by the illumination transducer to form the aiming pattern. The optical element may be at least one of a lens, a transparent cover, a filter, a reflector or a prism.

A method of producing a scanner apparatus may be summarized as including emitting illumination via at least one illumination transducer outwardly along a first optical path to pass the illumination via at least a first optical element in the first optical path that extends outwardly from the illumination transducer, the first optical element having a pattern that substantially blocks a portion of the illumination emitted by the illumination transducer to form an aiming pattern.

Emitting illumination via at least one illumination transducer may include emitting the illumination to pass through a spectral filter that substantially blocks a first set of wavelengths and substantially passes a second set of wavelengths to produce the aiming pattern of a defined color. Emitting illumination via at least one illumination transducer may include emitting the illumination to pass through a mask that substantially blocks a first portion of the illumination and substantially passes a second portion of the illumination to produce the aiming pattern of a defined spatial configuration. The method may further include providing at least one illumination responsive detector and positioning said at least one illumination responsive detector relative to the at least one illumination transducer to detect illumination emitted therefrom along the first optical path after return from an object along a second optical path.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 4 is an isometric view of a movable optical component in the form of a rotating polygonal mirror or reflector, which may be used in, or in conjunction with, the scan engine illustrated in FIG. 1, according to at least one illustrated embodiment.

FIG. 5 is a top plan view of a movable optical component in the form of a micro-machined electronic structure (MEMS) mirror or reflector, which oscillatingly pivots about two perpendicular axes to create a scan pattern, and which may be used in, or in conjunction with, the scan engine illustrated in FIG. 1, according to at least one illustrated embodiment.

FIG. 6 is an isometric view of a movable optical component in the form of a mirror or reflector, which oscillatingly pivots about an axis to create a scan pattern, and which may be used in, or in conjunction with, the scan engine illustrated in FIG. 1, according to at least one illustrated embodiment.

FIG. 7 is an isometric, partially exploded, view of a light or illumination source and an optical element to produce an aiming pattern, which may be used in, or in conjunction with, the scan engine illustrated in of FIG. 1, according to at least one embodiment.

In relation to aiming imagers.

DETAILED DESCRIPTION OF EXAMPLE EMBODIMENTS

Figure 1:
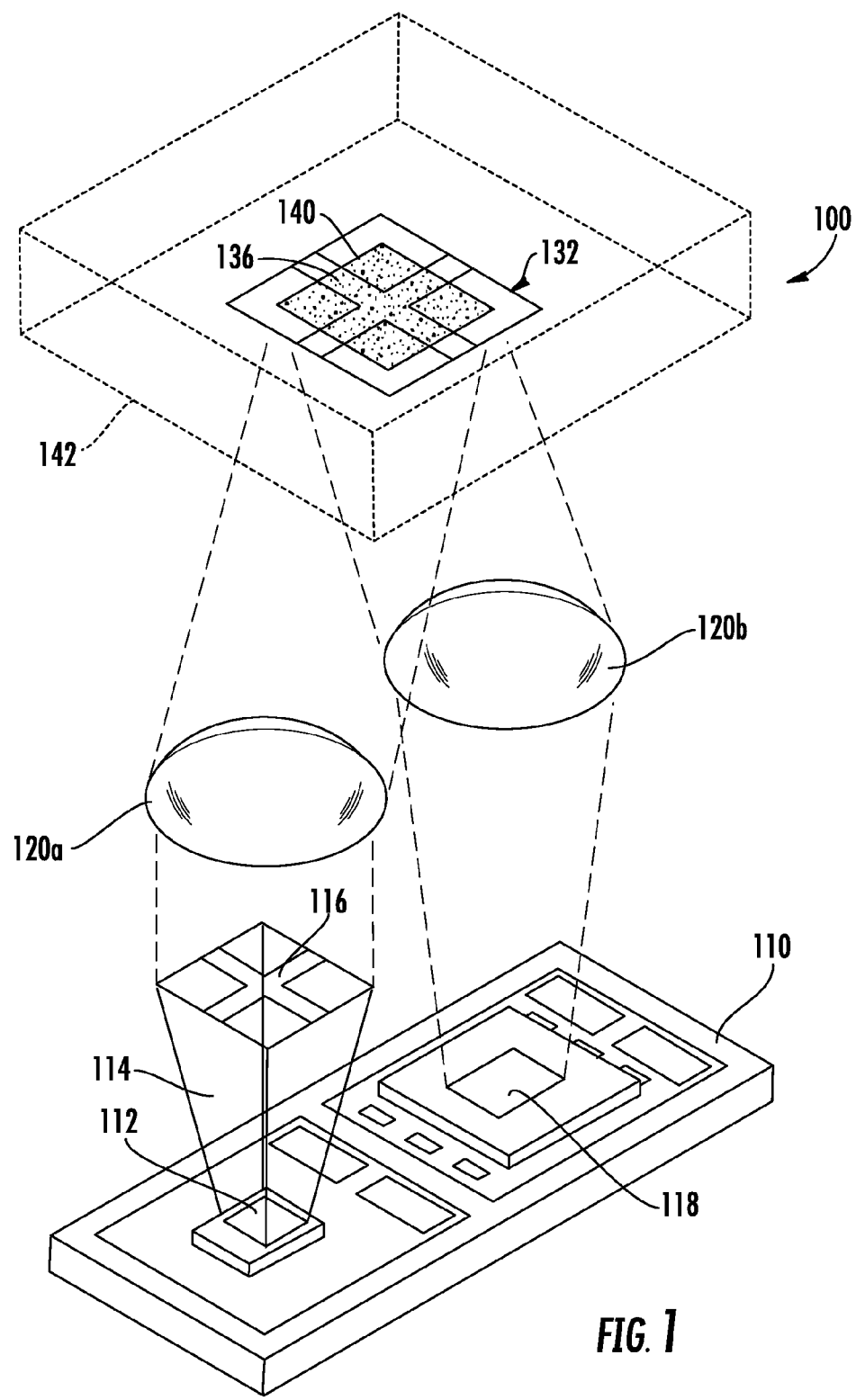
FIG. 1 is a schematic diagram of an object bearing a machine-readable symbol and a scan engine and lenses positioned to project an aiming beam at, and to read, the machine-readable symbol, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with automatic data collection devices, for instance, machine-readable symbol readers, light or illumination sources, light or illumination sensors or detectors, processors, non-transitory processor readable media, buses, and communications subsystems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, such as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings, summary, and Abstract of the Disclosure provided herein are for convenience only and do not interpret the scope or meaning of the embodiments.

A machine-readable symbol reader optically reads information encoded in machine-readable symbols, for instance, linear or one-dimensional barcode symbols or two-dimensional area or matrix or stacked code symbols. The machine-readable symbol reader may, for example, include a scan engine. The scan engine may include one or more light or illumination sources (e.g., LEDs, laser diodes or other source of collimated light) that illuminate a symbol to be read. As discussed above, a flood illumination type of machine-readable symbol reader may emit light to flood illuminate the target. As also discussed above, a scan or flying spot type machine-readable symbol reader emits a scanning spot or beam to sequentially illuminate the target in a defined scan pattern. The scan engine may also include one or more optical components. For example, a scan or flying spot type machine-readable symbol reader may include one or more movable (e.g., rotatable, oscillatingly pivotable) optical components which causes the scan spot or beam to move or scan in a defined pattern (e.g., raster scan pattern, Lissajous scan pattern). As further discussed above, conventional scan engines may further include one or more light or illumination sources (e.g., light emitting diodes or other source of light) that generate an aiming pattern or beam. For various reasons, the light or illumination source(s) that generate the aiming pattern or beam are typically separate and distinct from the light or illumination source(s) that generate the flood illumination field or scanning spot or beam.

The use of separate and distinct light or illumination sources result in an undesirably large package or scan engine. The size of the scan engine unnecessarily limits reduction in the size of the machine-readable symbol reader. This disclosure describes and illustrates various structures and approaches for reducing a size of a scan engine and/or machine-readable symbol reader. A broader range of devices and/or applications may take advantage of scan engines with aiming beam mechanisms which are smaller than those currently available.

In least some aspects, a common source of light or illumination produces both the aiming pattern or aiming beam and the illumination field or the scanning spot or scanning beam. In particular, a portion of light or illumination emitted or produced by the light or illumination source may be substantially blocked or reduced, to create the aiming beam or aiming pattern. For example, a mask having a defined spatial pattern may substantially block all or almost all wavelengths of light or illumination, to produce an aiming pattern or beam. Also, for example, a spectral filter having a defined spatial pattern and a defined spectral filtering profile may substantially remove a set of wavelengths from the light or illumination, to produce an aiming pattern or beam of a defined color. As used herein and in the claims, the term "substantially" means a sufficient amount to be visually perceptible via the human vision system. The light or illumination source is a transducer, converting energy, typically electrical power, into light or illumination of some defined wavelengths (e.g., white light). The mask or filter may be formed in, on, or otherwise carried by one or more optical components, for instance, a lens or cover. As used herein and in the claims, a lens does not necessarily need to magnify, focus or collimate light to constitute a lens, but rather can pass light substantially unchanged (e.g., transparent cover). The mask or filter, or some other approach, subtracts a portion of light to form the aiming pattern and/or aiming beam, imposed on either the flood illumination field or on an illumination field formed by the scanning spot over time (e.g., one complete cycle or an integral multiple of complete cycles of a scan pattern).

The use of a common source of light or illumination to produce both the illumination field and the aiming pattern or aiming beam substantially reduces a size of the scan engine, reduces the number of active components thereof, and generally simplifies the design and structure of the scan engine.

Example embodiments of the present invention relate to aiming imagers and are described with reference to FIG. 10 through FIG. 16, inclusive, at Section II, below. Presented first as a conceptual prelude, and to describe certain details, features, and/or aspects that may relate to one or more example embodiments of the present invention, an example automatic data collection apparatus and method is described at Section I with reference to FIG. 1 through FIG. 9, inclusive. The description presented in Section I relates to the related U.S. patent application Ser. No. 14/465,036, filed Aug. 21, 2014 by Serge Thuries, et al. and entitled Automatic Data Collection Apparatus and Method, which corresponds to U.S. Patent Application Publication No. 2015/0053769 A1, which are incorporated by reference herein.

Section I

Example Automatic Data Collection.

Figure 2:
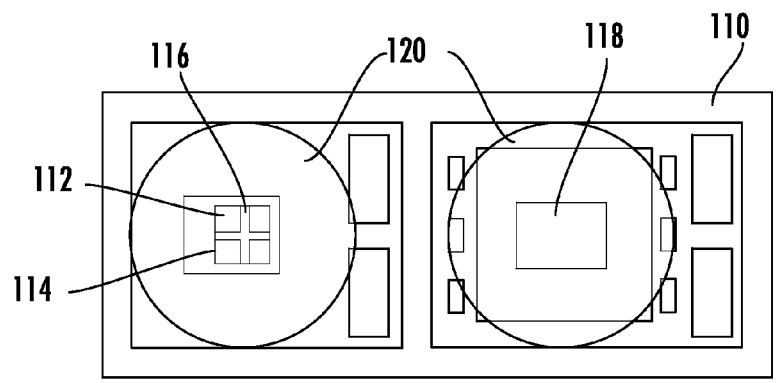
FIG. 2 is a top plan view of the scan engine illustrated in FIG. 1.

FIG. 1 shows a target 142 bearing a machine-readable symbol 140 and a portion of a machine-readable symbol reader 100 including a scan engine 110 and optional lenses 120a, 120b (two shown, collectively 120), according to at least one illustrated embodiment. FIG. 2 shows the scan engine 110 in isolation.

The scan engine 100 and a first lens 120a are positioned to project an illumination field 132 toward the target 142 and machine-readable symbol 140. The scan engine 100 and a second lens 120b are positioned to detect light or illumination returned from the target 142 and machine-readable symbol 140, whether by reflection, refraction, or florescence. The scan engine 100 subtractively imposes an aiming pattern 136 on the illumination field 132. One or both lenses 120 may be collimating lenses which collimate light passing therethrough.

The scan engine 110 includes one or more sources of light or illumination 112, an optical component 116 that subtractively imposes an aiming pattern on light or illumination emitted by the source(s) of light or illumination, and a detector 118 responsive to at least some wavelengths of light or illumination returned from the target.

The source(s) of light or illumination 112 (e.g., transducer(s) that convert energy into light or illumination) may take a variety of forms. For example, the source(s) of light or illumination 112 may take the form of one or more LEDs, for instance, an LED wafer or chip with one or more distinct LEDs. The LEDs may emit light or illumination in a defined range of wavelengths, for instance, white or substantially white light. Also, for example, the source(s) of light or illumination 112 may take the form of one or more sources of collimated light, for instance, lasers, such as a laser diode wafer or chip. The laser diode may emit light or illumination in a defined range of wavelengths, for instance, white or substantially red light.

The optical component 116 may take any of a variety of forms. The optical component 116 may be fixed with respect to the source(s) of light or illumination 112 or moveable with respect thereto. The optical component 116 may, for example, take the form of a lens, mirror or reflector, prism, dichroic mirror, or gel, having a mask or a filter. The mask or filter may be integrated into, carried on, or otherwise embodied in or associated with the optical component 116. The mask may be in the form of defined spatial pattern (e.g., cross, brackets, concentric circles target symbol), for example, deposited on a surface of the optical component 116. The mask substantially blocks light or illumination emitted by the source(s) of light or illumination 112, to subtractively impose the aiming pattern on the light or illumination emitted thereby. The filter may be in the form of a spectral filter, for example, deposited on a surface of the optical component. The filter substantially blocks a defined range of wavelengths of light or illumination emitted by the source(s) of light or illumination 112, while substantially passing another defined range, to subtractively impose the aiming pattern on the light or illumination emitted thereby. The result of the filter may be an aiming pattern of a defined color, different than a color of an illumination field, if the illumination field is visible. While the mask or filter are illustrated as being part of or carried by the optical component 116, the mask or filter may instead be part of or incorporated in the first lens 120a The detector 118 may take a variety of forms which are responsive to at least some wavelengths of light or illumination returned from the target. The detector is a transducer that converts light or illumination into a signal, typically a voltage or current. The detector 118 may, for example, take the form of one or more photodiodes, photosensors, CMOS optical sensors, or one- or two-dimensional arrays of charged coupled device (CCDs), Vidicons, etc. While FIGS. 1 and 2 illustrate the detector 118 as in integral component of the scan engine 110, such should not be considered limiting. The detector 118 may be an individual component supplied separately from the scan engine 110, for example, as part of a decode circuit board.

The scan engine 110 may optionally include a light pipe 114. The light pipe 114 may be any light guide providing a channel for the propagation of light or illumination from the source(s) of light or illumination 112 to the optical component 116.

In operation, the source(s) of light or illumination 112 selectively emit, generate, or produce light or illumination. The optional light pipe 114 provides an optical path for the light or illumination toward the optical component 116, which is outwardly positioned along the optical path from the source(s) of light or illumination 112. The light or illumination thus passes through the mask or filter of the optical component 116, subtractively creating an aiming pattern in the resultant illumination field. As previously noted, the first lens 120a may be a collimating lens, which produces a collimated beam which generally does not appreciably spread as the beam traverses the distance between the first lens 120a and the target or machine-readable symbol 140.

The resultant illumination field 132 with the aiming pattern 136 is best illustrated in FIG. 1, shown interposed on and around the machine-readable symbol 140. The illumination field 132 and the aiming pattern 136 may be concentric or in registration with one another, or the illumination field 132 and the aiming pattern 136 may have at least one axis of symmetry in common with one another. Such facilitates orienting the machine-readable symbol reader with respect to a machine-readable symbol to properly read the machine-readable symbol.

As previously noted the second lens 120b may be a collimating lens that directs collimated light or illumination returned from the machine-readable symbol 140 to the detector(s) 118.

As noted above, the scan engine 110 and/or machine-readable symbol reader 100 may include one or more additional optical components (e.g., lenses, dynamically configurable lenses, microfluidic lenses, mirrors, reflectors, prisms, dichroic mirrors), which have been omitted from FIGS. 1 and 2 to simplify the illustration and description. For instance, the machine-readable symbol reader 100 may include one or more moving optical components if the machine-readable symbol reader 100 is a scanning type device.

Thus, aspects and embodiments for producing an aiming pattern in an illumination field may be subtractive, producing the aiming pattern through removal of illumination of one or more wavelengths in a pattern spatially corresponding to the aiming pattern. In one embodiment, a reflector or lens interposed with a subtractive pattern subtractively imposes an aiming pattern on the light or illumination generated, produced, or emitted by the light or illumination source(s) 112.

By interposing a subtractive optical component 116 in an optical path of outward traveling light or illumination, an aiming pattern is formed or imposed in the corresponding illumination field. The aiming pattern is thus visibly perceptible at or proximate the target or machine-readable symbol 140. The subtractive optical component 116 may be placed in the optical path at any number of positions, so long as light or illumination is substantially blocked or filtered according to some spatial pattern. For example, the subtractive pattern (e.g., mask, filter) may be carried on, or integrated into, the first lens 120a. Also, for example, the subtractive pattern (e.g., mask, filter) may be positioned behind the first lens 120a. As another example, the subtractive pattern may be on a face of the light or illumination source(s) 112, for instance, on a clear or colored lens that covers a die or wafer. The subtractive mask or pattern may, for instance, be formed by a material deposited on the light or illumination source(s) 112.

Figure 3:
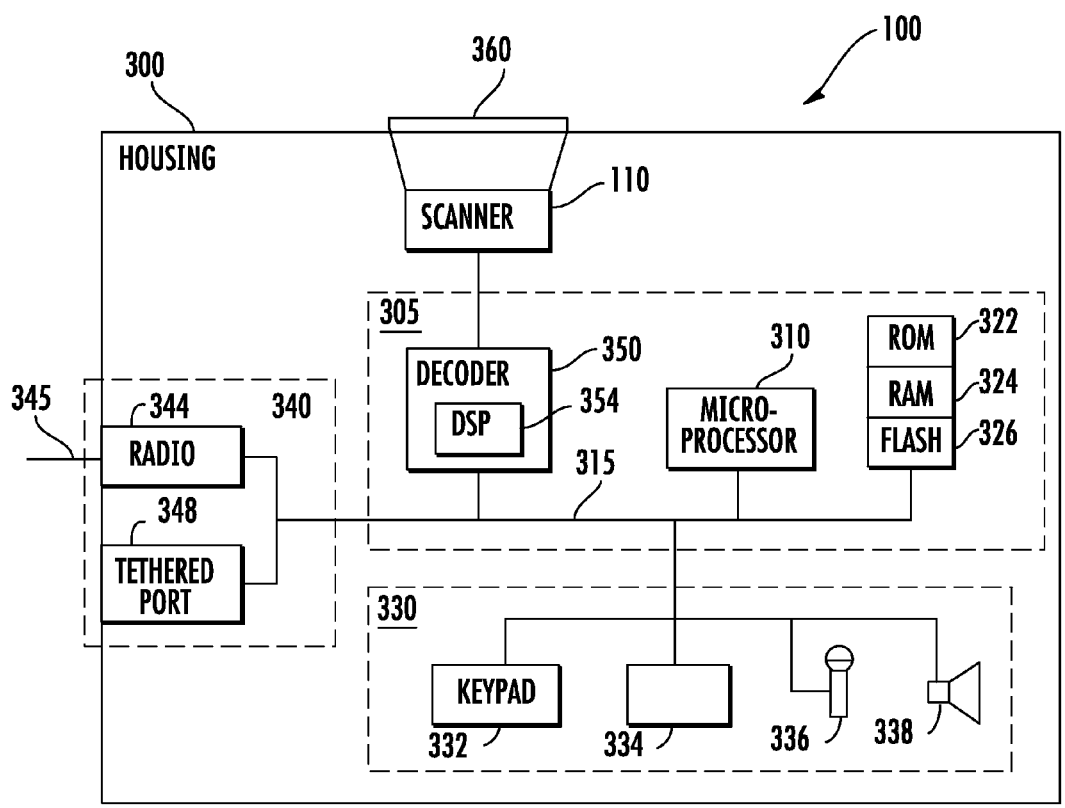
FIG. 3 is a block diagram of a machine-readable symbol reader, including a housing, circuitry, and the scan engine of FIG. 1, according to at least one illustrated embodiment.

FIG. 3 shows a portion of a machine-readable symbol reader 100 which incorporates the scanner engine 110, according to at least one illustrated embodiment.

The machine-readable symbol reader 100 includes a housing 300 which houses various components. The housing 300 may take any of a variety of forms, and may have any of a large variety of shapes. For example, the housing may have a handheld form factor, for instance, in the shape of a pistol or a rectangular box.

The machine-readable symbol reader 100 includes a control subsystem 305 for controlling operation of the machine-readable symbol reader 100. The control subsystem 305 may include one or more controllers, for instance, processors such as microprocessors 310, digital signal processors (DSPs) 354, graphical processing units (GPUs) (not shown), application specific integrated circuits (ASICs) (not shown), programmable gate arrays (PGAs) (not shown), programmable logic controllers (PLCs) (not shown), etc. The control subsystem 305 may also include one or more non-transitory computer- or processor-readable devices, for instance, one or more memories such as read only memory (ROM) 322, random access memory (RAM) 324, and/or Flash memory 326, or other forms of static or dynamic memory. While not illustrated, the control subsystem 305 may include other non-transitory media, for instance, spinning media such as a magnetic hard disk and hard disk drive (not shown) and/or optical disk and optical disk drive (not shown). The microprocessor(s) 310, GPUs, DSPs, ROM, RAM, FLASH, and/or other components are communicatively coupled via one or more communicative paths, for instance, one or more buses (only one illustrated) 315. The buses 315 may, for example, include a power bus, instruction bus, data bus, address bus, etc.

The machine-readable symbol reader 100 also includes a user interface 330. The user interface 330 may be communicatively coupled to, and controlled by, the microprocessor 310 via the bus 315. The user interface 330 may comprise a number of user input and/or user output components. For example, the user interface 330 may include a keypad 332, keys, switches, buttons, touch screen 334 with user selectable icons, switches, trackpad, trackball, joy or thumbstick and/or microphone 336 as user input devices. Also, for example, the user interface may include a display, lights, speaker(s) 338, and/or tactile or vibratory transducer as user output devices.

The machine-readable symbol reader 100 may include a communications subsystem 340 to allow communications with devices, systems, and/or networks external to the machine-readable symbol reader 100. The communications subsystem 340 may include one or more transmitters, receivers, or transceivers (collectively radios 344) to allow wireless communications. For example, the machine-readable symbol reader 100 may include radios 344 (only one shown) and associated antennas 345 (only one shown) for wireless communications via various communications standards and/or protocols, for instance, BLUETOOTH, WIFI, or cellular. The communications subsystem 340 may include one or more tethered ports 348 (only one shown) to allow wired or optical (collectively tethered) communications. For example, communications via various communications standards and/or protocols, for instance, USB, ETHERNET, FIREWIRE, or THUNDERBOLT standards and protocols. The radio(s) 344 and tethered port(s) 348 may be communicatively coupled to the bus 315.

The scan engine 110 is communicatively coupled to a decoder board 350, which may include one or more DSPs 354 or GPUs (not shown) and associated decoder circuitry (e.g., analog-to-digital converter, buffer). The decoder board 350 operates to decode the signal (e.g., scan line, one-dimensional or two-dimensional image data) produced by light returned to the machine-readable symbol reader 100 from the target or machine-readable symbol 140 (FIG. 1). Such may employ conventional decoding techniques.

In operation, the microprocessor 310 may cause actuation of one or more light or illumination sources of the scan engine 110, to provide light or illumination outwardly from a window 360 in the housing 300, for example, through a transparent cover or lens. The detector(s) 118 of the scan engine 110 receive light or illumination returned to the machine-readable symbol reader 100, and generates one or more signals indicative thereof. The decoder board 350 and DSP 354 may receive the signals from the scan engine 110, and process the signals to decode information encoded in a machine-readable symbol 140 (FIG. 1). Optionally, the microprocessor 310 may perform additional manipulation or processing on the decoded information, for example, transmitting such via the radio(s) 344 and/or tethered port(s) 348.

Scanning or flying spot type machine-readable symbol readers typically include one or more moving optical components (e.g., mirrors or reflectors) to scan the illumination spot or beam in a defined pattern. FIGS. 4-6 show some examples of moving optical components.

In particular, FIG. 4 shows a rotating mirror or reflector device 400, according to at least one illustrated embodiment. The rotating mirror or reflector device 400 includes a polygonal mirror or reflector 402 having multiple reflection faces 410a-410f (six shown, collectively 410). The polygonal mirror or reflector 402 is attached to an axle 404 which is driven, for instance, by an electric motor (not shown) to rotate about a rotation axis, as indicated by arrow 406. Each reflection face 410 may include or bear a mask or filter 415, having a defined shape to subtractively impose an aiming pattern on an illumination field reflected off the respective reflection face 410. The mask or filter 415 may be printed or deposited on the reflection faces or etched therein.

The rotating mirror or reflector device 400 may be positioned in an optical path of the source(s) of light or illumination 112 (FIGS. 1 and 2) of the scan engine 110. As the polygonal mirror or reflector 402 rotates, light or illumination reflected off the reflection faces 410 have the aiming pattern subtractively imposed thereon.

FIG. 5 shows a pivoting microelectromechanical system (MEMS) reflector device 500, according to at least one illustrated embodiment.

The pivoting MEMS reflector device 500 comprises a mirror or reflector 502, and a pair of frames 504a, 504b (collectively 504). The mirror or reflector 502 includes or bears a mask or filter 515 which subtractively imposes an aiming pattern on light or illumination reflected by the mirror or reflector 502. The mask or filter 515 may be printed or deposited on a face of the mirror or reflector 502 or etched therein. A first axle or pair of axles 506a pivotally couples the mirror or reflector 502 to the first frame 504a for oscillating pivotal motion about a first axis 508a, as indicated by double headed arrows 510a (only one called out). A second axle or pair of axles 506b pivotally couples the first frame 504a to the second frame 504b for oscillating pivotal motion about a second axis 508b, as indicated by double headed arrows 510b (only one called out). The first and second axes, collectively 508, may be perpendicular to one another, and the orthogonal to an optical axis (extending perpendicularly out of plane of drawing sheet) of the mirror or reflector 502. The pivoting MEMS reflector device 500 may include a number of electrodes (not illustrated) to apply a drive force (e.g., electrical potential or voltage), to cause the mirror or reflector 502 to oscillate about the first axis 508a, and to cause the first frame 504a to oscillate about the second axis 508b.

The mirror or reflector 502 may be positioned in an optical path of the source(s) of light or illumination 112 (FIGS. 1 and 2) of the scan engine 110. As the mirror or reflector 502 pivots, light or illumination reflected off the reflection face thereof has the aiming pattern subtractively imposed thereon.

FIG. 6 shows a pivoting mirror reflector device 600, according to at least one illustrated embodiment.

The pivoting mirror reflector device 600 includes a mirror or reflector 602. The mirror or reflector 602 may, for example, take the form of a flat mirror or reflector. The mirror or reflector 602 has or carries a mask or filter 615 in a defined spatial pattern. For example, the mirror or reflector 602 may include a frosted area 615, for example, with little or substantially reduced reflective properties at one or more wavelengths. The mask or filter 615 is illustrated as circular or oval, although other shapes or patterns may be employed.

The pivoting mirror reflector device 600 may include one or more axles 606 which pivotally mount the mirror or reflector 610 for oscillation about an axis 608, as indicated by double headed arrows 610 (only one called out). The axle(s) 606 may be oscillatingly driven, for example, via an electric motor (not shown) and appropriate drive train or mechanism.

The mirror or reflector 602 may be positioned in an optical path of the source(s) of light or illumination 112 (FIGS. 1 and 2) of the scan engine 110. As the mirror or reflector 602 pivots, light or illumination reflected off the reflection face thereof has the aiming pattern subtractively imposed thereon via the mask or filter 615.

FIG. 7 shows a source of light or illumination 700 which includes a die, wafer or chip 702 and an integral mask or filter optical component 704, according to at least one illustrated embodiment.

In particular, the die or wafer 702 may take the form of a silicon or other semiconductor fabrication, for instance, an LED or laser diode die, wafer or chip. Such dies, wafers, or chips often include a lens integrally formed therewith. The lens typically provides environmental protection to the electrical or electronic components of the die, wafer, or chip, for example, hermetically sealing and/or electrically isolating those components from the ambient environment. The lens may, for example, take the form of a transparent cover or encapsulant.

As illustrated, the integral mask or filter optical component 704 includes a mask or filter pattern 715. For example, the mask or filter pattern 715 may be printed or deposited on a surface (e.g., inner or outer face) of the integral mask or filter optical component 704. Also, for example, the mask or filter pattern 715 pattern may be formed by selectively depositing a reflective material (e.g., aluminum) on a surface, omitting the reflective material (e.g., via a stencil or mask) from those portions that will subtractively form the aiming beam pattern. Alternatively, the mask or filter pattern 715 may be etched into a surface (e.g., inner or outer face) of the integral mask or filter optical component 704. The integral mask or filter optical component 704 may be positioned directly adjacent the die, wafer or chip, and may be secured via an adhesive. The adhesive should not have an adverse effect on the optical characteristics of light or illumination emitted, generated, or produced by the die, wafer, or chip 702.

The integral mask or filter optical component 704 is inherently positioned in an optical path of the source(s) of light or illumination (e.g., die, wafer, or chip 702) of the scan engine 110. As light or illumination passes through the integral mask or filter optical component 704, a spatial pattern is subtractively removed. As previously noted, the mask or filter 715 may be spectrally selective. Thus, only some sets of wavelengths may be removed from the spatial pattern, resulting in an aiming beam pattern of a desired set of wavelengths or colors.

Figure 8:
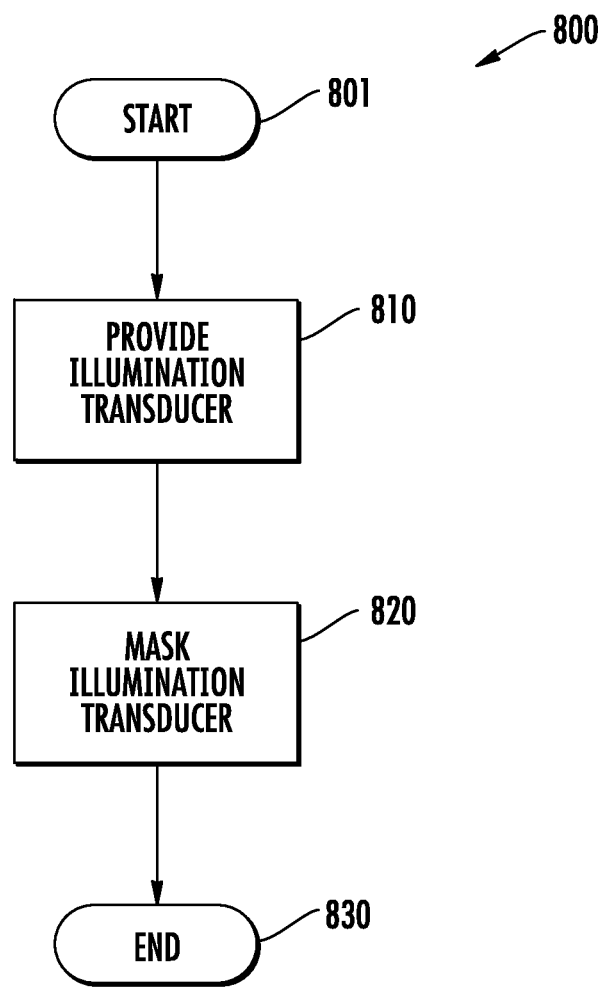
FIG. 8 is a flow diagram showing a method of producing an aiming beam and illuminating a target via a scan engine such as that illustrated in FIG. 1, according to at least one illustrated embodiment.

FIG. 8 shows a method 800 of building a scan engine or machine-readable symbol reader, according to at least one illustrated embodiment.

The method 800 begins or starts at 801.

At 810, one or more sources of light or illumination are provided. As discussed above, the source(s) of light or illumination may be a white LED die, wafer or chip, or some other source of electromagnetic energy which produces illumination in, for example, a visible portion of the electromagnetic spectrum. The source(s) of light or illumination emits, generates, or produces light or illumination, outwardly along an optical path. Using a white LED as an example, white light is emitted from the LED in a direction opposite a base of the LED, thus resulting in an optical path extending outward from a face of the LED.

At 820, an optical element including a mask or filter is inserted or positioned in the optical path. The mask or filter has a defined shape that results in a corresponding aiming pattern subtractively imposed on an illumination field which the source(s) of light or illumination emits, generates, or produces. For example, a cross-shaped mask or filter may be deposited or carried on the face of the LED. This mask or filter may be wavelength selective, substantially blocking a first set of wavelengths while substantially passing a second set of wavelengths. The resulting light or illumination in the aiming pattern will appear to be a defined color (e.g., red). Thus, a colored cross forming an aiming pattern is subtractively formed in the illumination field produced by the LED. The mask or filter should be positioned relative to the LED such that the aiming pattern is centered in or is at least axial symmetric with the illumination field. As previously noted, the illumination field may, for example, be white light, while the aiming pattern may be a constituent color of white light (e.g., red). Consequently, by interposing the optical element with the mask or filter in the optical path, both aimer and illumination functionality may be realized with a common source of light or illumination.

The method 800 ends or terminates at 830.

Figure 9:
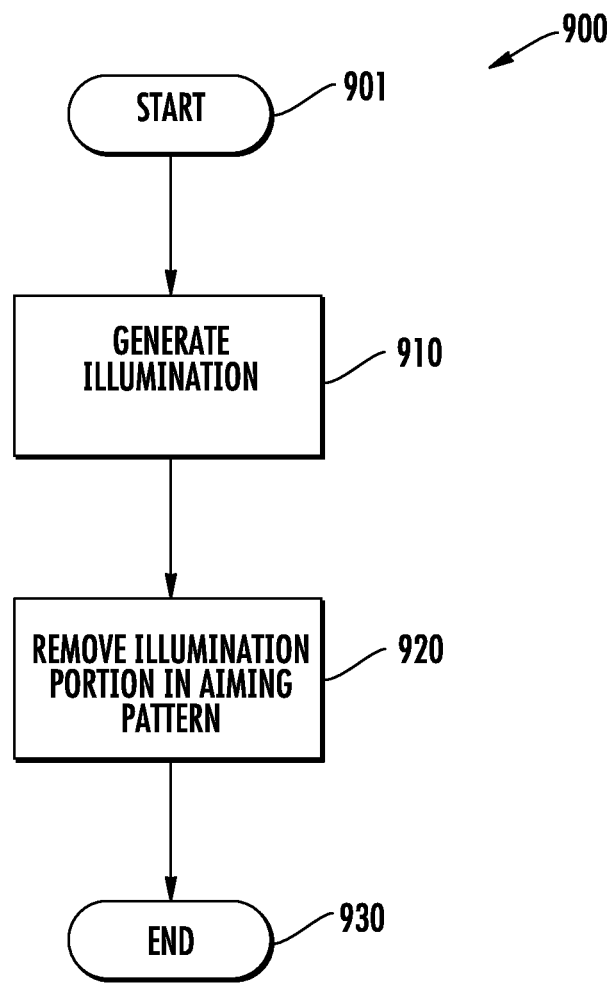
FIG. 9 is a flow diagram showing a method of producing an aiming beam and illuminating a target via a scan engine such as that illustrated in FIG. 1, according to at least one illustrated embodiment.

FIG. 9 shows a method 900 of operating a scan engine or machine-readable symbol reader, according to at least one illustrated embodiment.

The method 900 begins or starts at 901.

At 910, one or more sources of light or illumination emit, generate, or produce light or illumination. For example, a controller may cause one or more LEDs to emit, generate, or produce light or illumination. The illumination substantially traverses an optical path extending outward from a face of the LEDs.

At 920, a mask or filter subtractively removes a portion of the light or illumination which the one or more sources of light or illumination emit, generate, or produce. In particular, the mask or filter may remove light or illumination in a spatial pattern, which defines an aiming pattern. As previously noted, the mask or filter may be part of or carried by an optical element. Also as previously noted, the mask or filter may be wavelength selective or a spectral mask or filter. The mask or filter may have any desired spatial configuration or shape, including contiguous and non-contiguous shapes or patterns.

Flowchart 900 ends at 930.

While in the above, producing the aiming pattern in illumination has generally been described with regard to a single monolithic optical element, this is by way of convenience for explanation and is not meant to be limiting with regard to aiming pattern generation in the illumination. For example, a portion of the aiming pattern may be formed by a first filter and a portion of the aiming pattern may be formed by a second filter, and these filters may be positioned at different positions or locations in the optical path extending outwardly from the transducer. That is, the aiming pattern may be formed by multiple elements in conjunction, and these elements may be located apart or together in the optical path associated with illumination emitted by the transducer.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary object evaluation system generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or may be implemented in standard integrated circuits.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet that are commonly assigned to the same assignee of this application are incorporated herein by reference, in their entirety. Aspects of the embodiments can be modified, if necessary, to employ systems, circuits, and concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Machine-readable symbol readers and/or scan engines may subtractively impose an aiming pattern on an illumination field produced by a source of light or illumination. An optical component with a mask or filter is interposed in an optical path extending outwardly from the source of light or illumination. The mask or filter may have a defined shape or configuration to subtractively produce an aiming pattern with a desired shape or configuration. The mask or filter may, or may not, be wavelength selective or spectral. A wavelength selective mask or filter may produce an aiming pattern of a defined color, different from a color of an illumination field. Such may eliminate the need for a separate, distinct source of light or illumination for an aiming beam subsystem. The described structures and methods may reduce size, reduce parts count, and/or simplify manufacture.

Example embodiments of the present invention relate to aiming imagers. As a conceptual prelude, as well as to describe certain details, features, and/or aspects that may relate to one or more example embodiments of the present invention, the foregoing Section I describes an example automatic data collection apparatus and method, with reference to Figure (FIG. 1 through FIG. 9, inclusive. Example embodiments of the present invention, which relate to aiming imagers, are described with reference to FIG. 10 through FIG. 16, inclusive, at Section II, below.

Section II

Aiming Imagers

Example embodiments of the present invention relate to aiming imagers and are described as follows with reference to FIG. 10 through FIG. 16, inclusive, in the present Section II. Presented first as a conceptual prelude, and to describe certain details, features, and/or aspects that may relate to one or more example embodiments of the present invention, example automatic data collection apparatus and methods have been described at Section I above with reference to FIG. 1 through FIG. 9, inclusive. While the foregoing description presented in Section I relates to an example automatic data collection apparatus and method that may relate to the aiming of imagers, it is by no means intended to be construed as limiting in any way. On the contrary, example embodiments of the present invention are well suited to aiming images using other approaches and/or techniques in relation to automatic data collection.

Aiming Imagers.
Overview.

Graphic media are generally useful for presenting information to their viewers. Data are represented in some graphic media using one dimensional (1D) and two dimensional (2D) geometric pattern arrays, such as 1D bar code patterns ("bar codes") and 2D matrix data patterns (e.g., Han Xin, QR). Bar codes such as International Article Number/Universal Product Code (EAN/UPC) patterns, for example, present graphic data useful over a wide variety of logistics, industrial, transportation, commercial, technical, consumer, and other applications.

An imaging system (imager) typically comprises a scan engine component (scanner) operable for scanning bar codes and other media to gather, retrieve and access the graphic data presented therein. Scanners typically illuminate the graphic media, while exposing a photosensor to capture light reflected therefrom, which may then be processed by the imager. Imagers may be specialized for bar code reading and/or other uses.

Newer "low profile" imager scan engines have been implemented as thin as 14 millimeters (14 mm). Incorporating such low profile scanners, specialized imagers such as the EA11™ and EA30™ are now available (commercially from the Intermec™ subsidiary of Honeywell™ International, a corporation in New Jersey) as thin as about 14 mm. This low level of thickness dimension suffices for some applications.

Such low profile scan engines may be used, for example, in fixed, stationary, or lower mobility imagers that may be associated with some industrial, commercial, or logistic settings. The low profile scan engines may also be incorporated into portable or somewhat mobile imagers such as some portable data terminal (PDT) devices.

Mobile computing devices ("mobile devices") are designed, marketed, and used, at least in part, for features relating to high portability. The portability features include, for example, light weight, high energy source endurance, and small form factors over multiple dimensions. In the thickness dimension, a thin form factor is typically desirable for many mobile devices.

Example mobile devices include (without limitation) "smartphones" and other mobile telephone devices, tablet computers and laptop computers ("tablets" and "laptops," respectively), portable/personal digital/data assistant (PDA) devices and some lower form factor PDTs. In addition to portability, modern mobile devices comprise a variety of useful functionality related features.

The functionality features add significant utility and versatility to the mobile devices. In addition to their telephonic capability for example, smart phones (and other modern mobile devices) may comprise optics and electronics, which with the nontrivial levels of computing power they typically possess, allows them to operate as cameras for capturing and processing image data.

With such versatility and utility, combined with their portability (in an era of economical "consumer electronics" availability generally), mobile devices have become effectively ubiquitous in commerce, industry, government, and personal use. Mobile devices thus enjoy widespread success in the marketplace, and have even empowered some users who, hitherto, could neither afford, nor efficiently deploy, effective computing resources.

Adding the functionality of the imagers specialized for bar code reading and other applications could effectively increase the versatility and utility of mobile devices significantly. With such added functionality, smart phones, tablets and other mobile devices can be used effectively, for example, in applications now handled in typically industrial settings by the more specialized imager systems.

Mobile devices featuring the capability of the specialized imagers can effectively implement bar code scanning on a massive scale. As they typically feature thinness as a significant design aspect however, some mobile devices are too thin to support installation of the conventional seven millimeter (7 mm) thick imagers available currently. Some projections suggest that imager thickness reductions below 7 mm may significant increase their incorporation into mobile devices, going forward.

Increasing the general availability of efficient and fully effective bar code reading and other imaging applications economically and over a wide scale may be useful. Adding the operability features available typically from dedicated bar code readers and other specialized imager systems to mobile devices in common general use, which feature currently (and increasingly) thin form factors may also be useful. Incorporating fully operable bar code readers and/or other specialized imagers into the mobile devices effectively and economically, and without adding to their thickness, may further be useful.

Accordingly, in one aspect, example embodiments of the present invention relate to increasing of the general availability of efficient and fully effective bar code reading and other imaging applications economically and over a wide scale. The increase in the general availability of bar code reading and other imaging is implemented with an addition these features to widely available mobile devices, which may also feature thin form factors. The bar code readers and other specialized imagers are incorporated into the mobile devices effectively and economically, and without adding to their thickness.

In an example embodiment of the present invention, a scanner system is operable for gathering graphic data from a scan target. The scanner system comprises a single, unitary illumination source component and a detector component. The single illumination source is operable for generating light, for aiming the scanner system with a beam of the generated light directed at the scan target, and for illuminating the scan target with the directed light. The detector component is operable for sensing a reflection from the scan target, the sensed reflection comprising a portion of the directed light with which the scan target is illuminated, and for detecting information in the sensed reflection, in which the information detected in sensed reflection corresponds to the graphic data gathered from the scan target.

As used in relation to a light source herein, the term "single" refers to a single, unitary source of light. In an embodiment of the present invention, for example, one single, unitary light source may be operable both for aiming a scanner, and for illuminating (lighting) the scan target, at the same time. This definition is intended to apply to the light sources mentioned herein (except wherein a particular usage of the term is expressly stated to have an additional, expressly defined meaning in that, and only in that particular usage, if any). An example embodiment may be implemented wherein the single, unitary light source comprises single, unitary array of active light emitting optoelectronic elements, such as a single, unitary array of two or more optically emissive diode devices disposed in a single, unitary package and operable together therein for aiming a scanner, and for illuminating the scan target simultaneously with a single, unitary light beam emitted from the package.

Example embodiments thus combine an aiming functionality directly into illumination source optics of the imager and eliminate a separate additional light source for aiming. In addition to reducing costs associated therewith, eliminating separate aimer light sources reduces space occupied by the imagers and allows their incorporation into thin form factor mobile devices with no increased thickness.

Example embodiments of the present invention comprise a subtractive aimer, which filter a portion of the light used for illuminating the bar code or other item to be scanned. As used herein, the term "scan target" refers to the bar code or other data pattern (1D or 2D), graphic medium or other indicia or visible item to be scanned by the imager. The subtractive aimer comprises a colored or patterned filter, which may be translucent or have another characteristic of at least partial less than full transparency.

Thus, as the scan target is illuminated generally for imaging, the filtered portion of the light beam casts a shadow over a portion of the scan target. The shadow conforms to the filter color and/or pattern of the subtractive aimer and when cast over the portion of the scan target, allows the light beam to be directed for aiming the scanner. While the shadow provides for aiming the scanner, the unfiltered remainder of the light beam suffices to illuminate the scan target effectively.

The subtractive filter thus comprises a passive optical filter device operable for filtering a portion of the light emitted by the single illumination source. The passive optical filter device may comprise a chromatic pattern and/or a partially non-transparent pattern. An example embodiment may be implemented in which the passive optical filter device is disposed, deployed, or inserted within a beam path of the generated light.

For example, the passive optical filter device may be disposed or deployed within a light pipe through which the beam is projected or conducted. The passive optical filter device and is operable for casting a shadow, within the directed light, over a portion of the scan target. The aiming of the scanner system at the scan target comprises positioning the scanner system such that cast shadow is placed over the scan target portion.

An example embodiment may be implemented in which the single illumination source comprises at least one active optoelectronic device, such as a laser diode (LD) or a light emitting diode (LED), which is operable for emitting the generated light. The detector component may comprise at least one active photosensitive optoelectronic device ("photosensor").

The photosensor may comprise a charge coupled device (CCD), complementary metal oxide semiconductor (CMOS), photodiode (PD), charge-injection device (CID), charge modulation device (CMD), P-channel or N-channel metal oxide semiconductor field effect transistor (MOSFET) device, or an array of the devices. The devices of the array may comprise a plurality ("two or more") of the CCD, CMOS, PD, CID, CMD, P-channel MOSFET (PMOS), or N-channel MOSFET (NMOS) devices.

An example embodiment may be implemented in which the scanner system further comprises one or more passive optical lens devices. At least a first lens is operable for focusing the beam of the generated light in relation to the aiming of the scanner system and the illumination of the scan target. A second lens may be operable for collecting the reflection, in which the collected reflection is focused onto a light sensing portion of the detector.

The scan target may comprise one-dimensional (1D) bar code patterns and/or two-dimensional (2D) bar code patterns. Example embodiments of the present invention may be incorporated into a host mobile computer device ("mobile device"), such as smart phones, tablet and laptop computers, mobile telephones, or a personal (or "portable") digital (or "data") assistant (PDA), and the PDTs. The scanner may thus further comprise an interface operable for coupling the scanner system communicatively to the host platform.

The scanner may also comprise a reader operable for processing the information detected in the sensed reflection, in which the processed information comprises the graphic data gathered from the scan target. The communicative coupling of the scanner system to the host platform may comprise controlling the scanner system in relation to the gathering of the graphic data from the scan target, and to providing the processed information read from the sensed reflection to the host platform.

In another aspect, the present invention relates a method for gathering graphic data from a scan target. In an example embodiment, light from a single illumination source is generated and a beam of the generated light filtered to modify a portion thereof. The modified portion of the filtered light beam is aimed at the scan target, such that the beam of the generated light is directed to the scan target, which is illuminated generally therewith.

A reflection from the scan target is sensed. The sensed reflection comprises a portion of the directed light with which the scan target is illuminated. Information corresponding to the graphic data gathered from the scan target is detected in the sensed reflection.

The modified light beam portion comprises a pattern imparted by the filtering and cast as at least a partial shadow conforming to the pattern. The aiming of the scanner step comprises directing the at least partial shadow over a portion of the scan target.

The aiming the scanner step may comprise directing the beam of the generated light in relation to the aiming step and the scan target is illuminated generally therewith.

The sensing the reflection step may comprise collecting the reflection, in which the collected reflection is focused onto a light detector. The method may also comprise processing the information detected in the sensed reflection, in which the processed information comprises the graphic data gathered from the scan target.

The method may also comprise controlling the scanner system, from a host platform, in relation to the gathering of the graphic data from the scan target, and providing the processed information read from the sensed reflection to the host platform.

An example embodiment may relate to a non-transitory computer readable storage medium comprising instructions, which are operable when executing on a processor of a computer system for causing and/or controlling a scanning process (e.g., in relation to the method, as above in overview). The processor may comprise a component of an imager (e.g., as above in overview). The processor may comprise a component of a mobile device or another host computer system.

In yet another aspect, the present invention relates to a mobile device. In an example embodiment, the mobile device comprises a scanner system component and a computer component operable therewith.

The scanner component is operable for gathering graphic data from a scan target. The scanner component comprises a single illumination source and a photosensitive detector. The single illumination source is operable for generating light, for aiming a scan using a beam of the generated light directed at the scan target, and for illuminating the scan target with the directed light. The detector is operable for sensing a reflection from the scan target. The sensed reflection comprises a portion of the directed light with which the scan target is illuminated. The detector is also operable for detecting information in the sensed reflection, in which the information detected in sensed reflection corresponds to the graphic data gathered from the scan target.

The computer system component is operable for processing the graphic data gathered from the scan target. The computer system component is also operable for performing at least one other processing function, which is substantially independent from the processing of the gathered graphic data. For example, the computer system component may comprise a mobile device hosting the scanner component, which is disposed, deployed, or incorporated therein. The scanner component allows the mobile device to perform imaging related functionality, such as bar code scanning.

In an example embodiment, the mobile device comprises a "computerized" or computer related apparatus (computer). The computer comprises a data and a processor coupled to the bus. The computer also comprises a non-transitory storage medium component (e.g., memory, drives) coupled to the bus. The non-transitory storage medium comprises instructions, which are stored tangibly (physically, e.g., electronically, optically, electromagnetically). The stored instructions are operable, when executing on the processor, for causing and/or controlling the scanner component to perform a process for gathering graphic data from scan targets (e.g., as above in overview).

Example embodiments of the present invention are thus described in relation to aiming imagers. A scanner system is operable for gathering graphic data from a scan target. The scanner system has a single illumination source component operable for generating light, for aiming the scanner system with a beam of the generated light directed at the scan target, and for illuminating the scan target with the directed light. The scanner system also has a detector component operable for sensing a reflection from the scan target, the sensed reflection including a portion of the directed light with which the scan target is illuminated, and for detecting information in the sensed reflection, in which the information detected in sensed reflection corresponds to the graphic data gathered from the scan target.

Example Imager Scan Engines with Dual Light Sources.

Adding capabilities associated with current state of the art imager scan engines to mobile devices has the potential to increase the availability of useful applications such as bar code scanning significantly and economically. Current low profile scan engines have been incorporated into some PDTs.

Scan engines used currently in PDTs are described in the patent and published patent applications listed below, which present explanations of operating principles that may relate to some imager scan engines in general. The following U.S. patent and published patent applications are incorporated by reference for all purposes as if fully set forth herein: U.S. Pat. No. 8,256,680 to Lawson, et al. for "Image engine with multiple drivers"; U.S. Pat. Appl. Pub. No. 2005/0274806 by Dant for "System, method and article for enhancing aiming in machine-readable symbol readers, such as bar code readers"; and U.S. Pat. Appl. Pub. No. 2012/0193429 by Van Volkinburg, et al. for a "Terminal with flicker-corrected aimer and alternating illumination."

Each of the scan engines described in the patent and published patent applications listed above, and other imager scan engines typically, comprise at least two distinct light sources. The at least two scan engine light sources comprise at least one aiming light source, which is operable for projecting a light beam used for aiming the imager at a scan target. For example, the imager may be aimed by aligning it relative to the projected aiming light beam.

In addition, the at least two scan engine light sources comprise at least one illuminating light source, which is distinct in relation to the aiming light source and operable for illuminating the scan target upon the aiming of the imager thereto. Each of the scan engines described in the patent and published patent applications listed above, and other imager scan engines typically, are operable for capturing an image of the scan target using the light with which it is illuminated.

Figure 10:
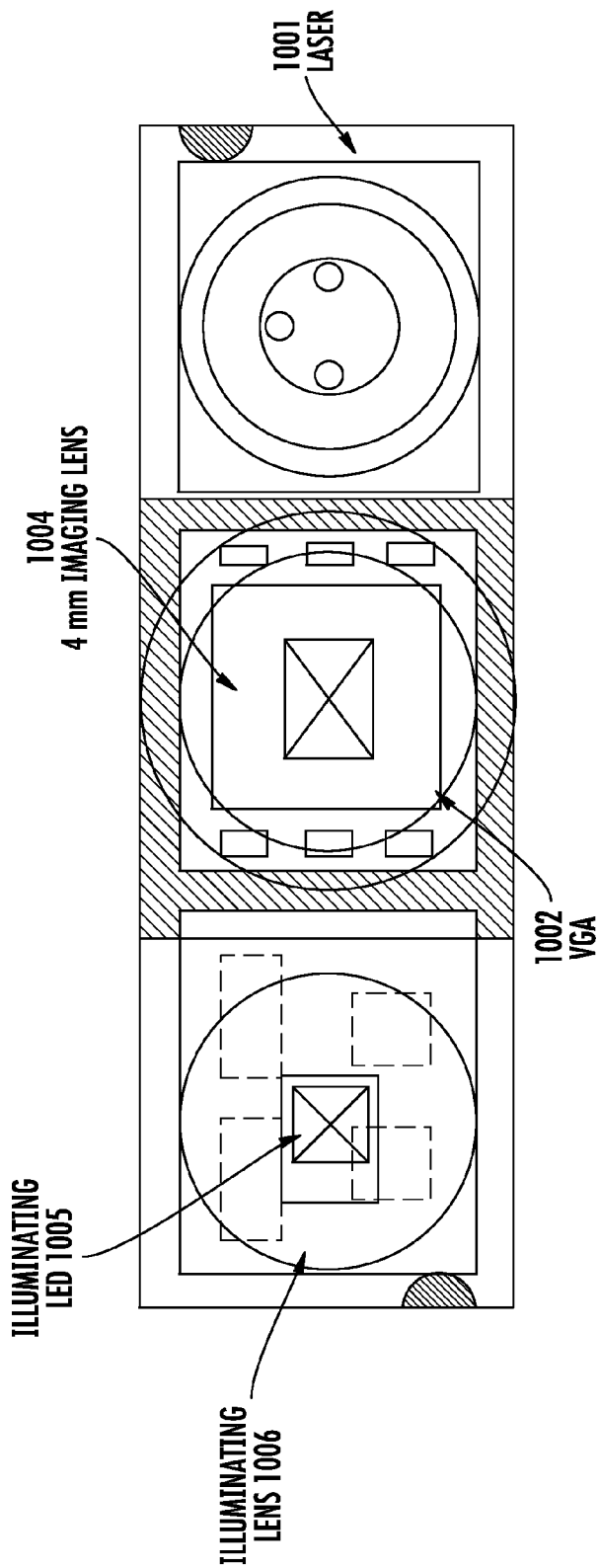
FIG. 10 depicts an example imager scan engine with two distinct aiming and illuminating light sources.

To allow or promote their incorporation into host electronic devices with contemporary thin form factors, thinner imager scan engines, having the distinct aiming and illuminating light sources, are under development. FIG. 10 depicts an example imager scan engine 1000 with distinct aiming and illuminating light sources. The scan engine 1000 may feature an "ultra-slim" (ultra-thin) thickness form factor, which could permit or support its incorporation into some thin modern mobile devices.

The scan engine 1000 comprises two distinct light sources. The scan engine 1000 comprises an aiming LD 1001, which is operable for providing a laser beam used for aiming the scan engine 1000 at a scan target. The laser beam emitted by the LD 1001 is directed at the scan target and the imager is aligned with the scan target accordingly, based on the position of the directed laser beam. The scan engine 1000 also comprises an illuminating LED 1005 operable for illuminating the scan target.

Upon the aiming of the imager, the LED 1005 may be energized to emit a beam of light with which the scan target is illuminated for imaging. An illumination lens 16 may be disposed proximate to the LED 1005 and operable for collimating, projecting, and/or focusing the illumination light beam emitted therewith. Illumination light reflected from the scan target may be gathered by an imaging lens 1004 and focused therewith on a detector 1002, such as a video graphics array (VGA) 1002.

The detector 1002 is operable for detecting image related data in the reflection of the light reflected from the scan target and focused onto its photosensitive image scanning surface. To prevent the possibility of optical effects on the illumination of the scan target and/or the detection of light reflected therefrom, the LD 1001 may be deenergized upon initiating the scan target illumination by the LED 15, which may also economize on the consumption of power by the imager.

Example Image Scanner with a Single Light Source.

Figure 11:
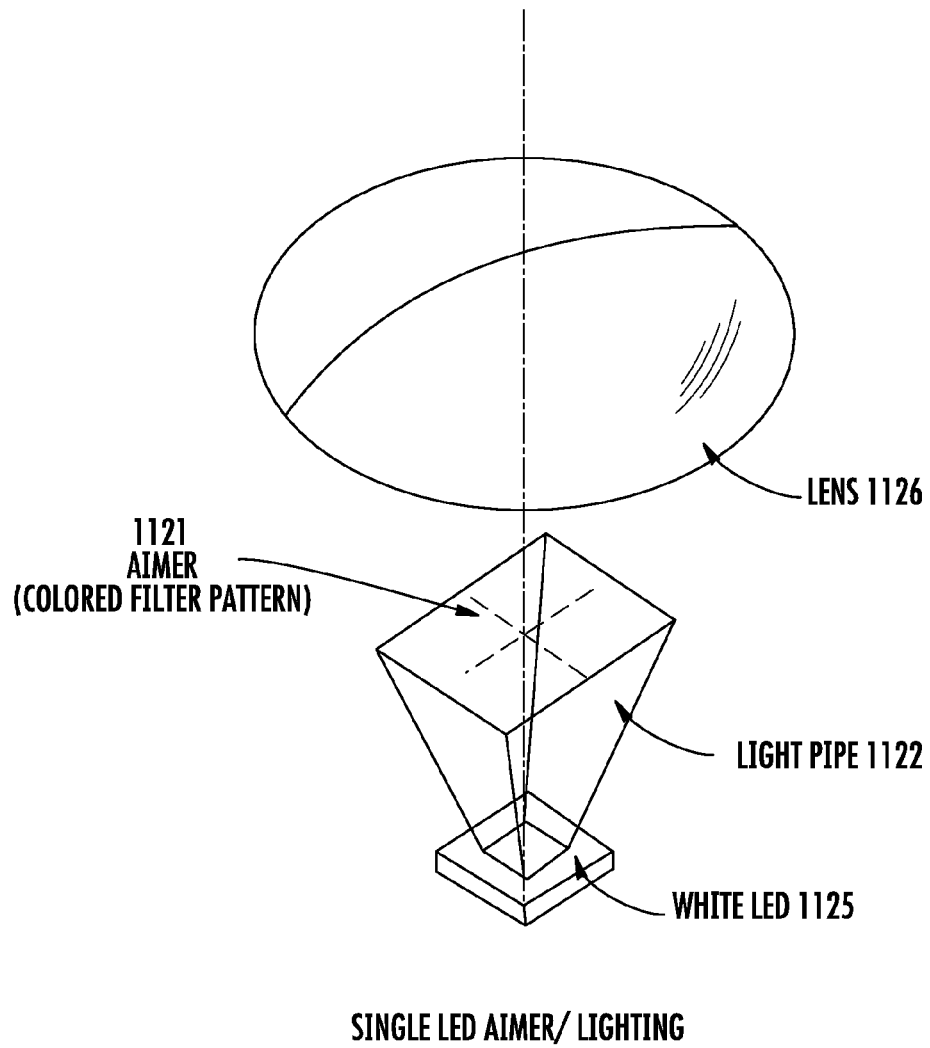
FIG. 11 depicts an example image scanner with a single, unitary light source, according to an embodiment of the present invention.

Example embodiments of the present invention relate to imager scan engines ("image scanners") with a single, unitary light source. The single, unitary light source is operable for both aiming the imager in which it is disposed, deployed, or incorporated at a scan target, and simultaneous with the aiming, illuminating the scan target. FIG. 11 depicts an example image scanner 1120 with a single, unitary light source, according to an embodiment of the present invention.

The image scanner 1120 comprises an active optoelectronic device 1125 such as a LD or an LED, which is operable for emitting light within a visible portion of the electromagnetic spectrum. An example embodiment may be implemented in which the active optoelectronic device 1125, when energized, is emissive over a wide range of optical frequencies for illumination of scan targets therewith. For example, the active optoelectronic device 1125 may comprise an LED emissive of white or other broad visible band light. The light may also be emitted monochromatically or near-monochromatically. For example, the light may comprise a single wavelength of 650 nanometers (nm). The light may also be emitted over one or more narrow frequency bands. For example, the light may comprise at least one narrow band, which may have a center wavelength at or near 650 nm or another wavelength.

The emission of the white light by the LED 1125 spans a frequency range of sufficient breadth for efficient illumination of various scan targets and their surfaces under different ambient lighting conditions. The scanner 1120 may also comprise a transparent light pipe 1122, which is operable for transmitting, conducting, and/or guiding the light emitted by the LED 25 to a passive optical lighting lens 1126. The lighting lens 1126 is operable for collimating, focusing, or projecting the light as a beam.

The light beam is operable for aiming the imager and for illuminating the scan target. The scanner 1120 also comprises an aimer 1121, which is disposed, positioned or deployed within a beam path of the generated light, such as between the emissive surface of the LED 1125 and the illuminating lens 1126. The aimer 1121 comprises a passive optical filter device. The aimer 1121 may be implemented as colored pattern operable as a chromatic band pass filter. The aimer 1121 may also comprise a subtractive or partially non-transparent (e.g., translucent or other than fully transparent) pattern. The aimer 1121 may also be opaque.

In conformance with its shape, the aimer 1121 is operable for filtering (e.g., absorbing) a portion of the light beam, which allows direction thereof at the scan target and the corresponding aiming of the imager in which the scanner 1120 is disposed, deployed or incorporated. For example, the aimer 1121 casts at least a partial shadow, which conforms to the shape of its colored and/or partly non-transparent pattern, over a portion of the scan target and the imager is positioned in accordance therewith.

Upon positioning the imager such that the shadow is cast over a desired portion of the scan target, the scan target is illuminated effectively by the light remaining in the unfiltered portion of the beam. Example embodiments of the present invention are thus operable, using a single, unitary light source, for aiming the imager and for illuminating the scan target, effectively at the same time.

Moreover therefore, example embodiments obviate the use of two distinct, separate, and/or independent light sources, one for aiming the imager and another for illuminating the scan target. Relative to imager scan engines that use distinct aiming and illuminating light sources, example embodiments implement scanners that comprise fewer components and thus have lower costs, fewer and simpler resources associated with their operation and control, and smaller dimensions and form factors.

The smaller form factors allow the single light source scanners to be implemented for incorporation into small, thin host computer platforms such as mobile devices. The single light source scanners of example embodiments may thus add the functionality of specialized bar code scanning and similar applications to thin form factor mobile devices, such as smart phones and other mobile telephones, tablet and laptop computers, PDAs and ultra-small PDTs. As used herein, the term "thin" refers to a form factor, such as a thickness related dimension.

Figure 12:
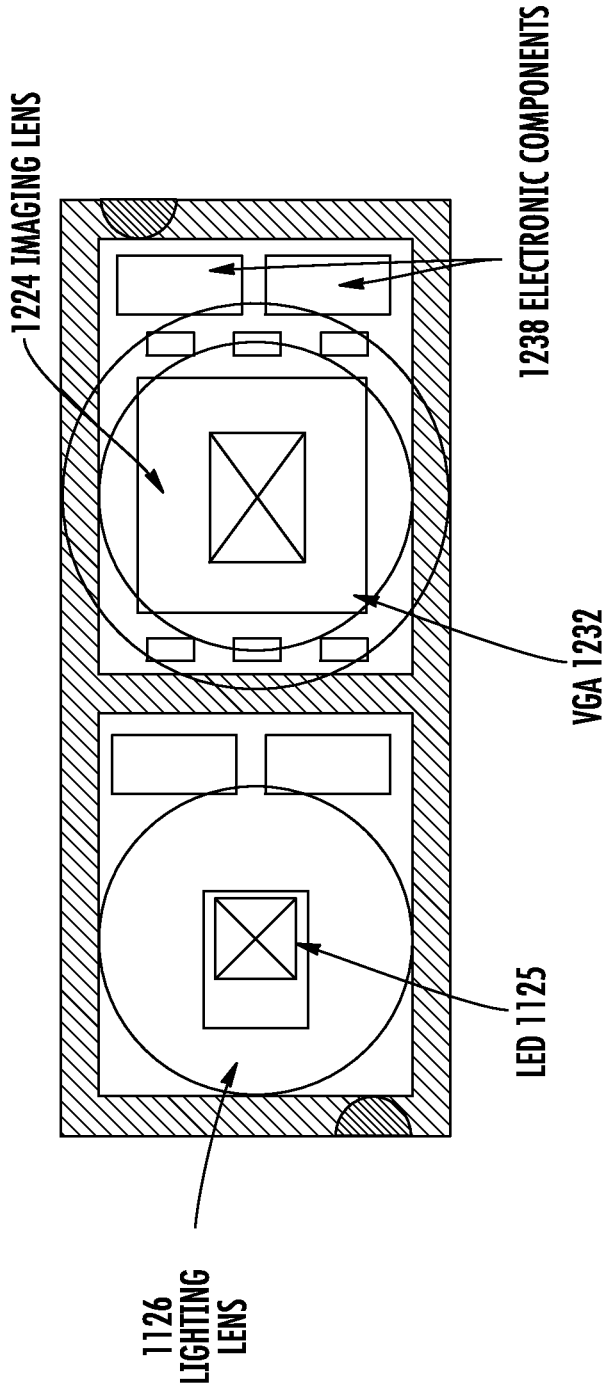
FIG. 12 depicts an example implementation of an image scanner with a single, unitary light source, according to an embodiment of the present invention.

FIG. 12 depicts an example implementation 1230 of the image scanner 1120 with a single, unitary light source 1125, according to an embodiment of the present invention. The implementation 1230 of the scanner 1120 may be implemented to have a small form factor, e.g., relative to imager scan engines that use distinct aiming and illuminating light sources. The implementation 1230 of the scanner 1120 comprises the single light source 1125 and a detector 1232. The single light source 1125 and the detector 1232 may exchange data and control signals with one or more electronic components 1238.

The single light source light source 1125 may comprise an LED, such as a Luxeon-Z™ (commercially available from LumiLEDs™, a corporation in California). The detector 1132 may comprise a VGA, such as a Model No. 'OV7675' VGA Camera Module (commercially available from OmniVision™, a corporation in California). The implementation 1230 of the scanner 1120 also comprises the illumination lens 1126 and the imaging lens 1124.

The illumination lens 1124 is disposed proximate to the LED 1125 and is operable for collimating, projecting, and/or focusing the illumination light beam emitted therewith. The aimer 1121 (FIG. 11) or a similar subtractive passive optical filter may be disposed between the LED 1125 and the illumination lens 1126. Light reflected from the scan target illuminated therewith is gathered by an imaging lens 1124 and focused therewith on the VGA 1232. The imaging lens is disposed in proximity to the VGA 1232. The lenses 1124 and 1126 may each be disposed on a surface of a package in which the LED 1125, the VGA 1232 and components 38 are disposed.

In an example embodiment of the present invention, the scanner 1120 comprises a system is operable for gathering graphic data from a scan target. The scanner 1120 comprises the LED 1125 as a single illumination source component, and the detector component 11132. The LED 1125 is operable for generating light, for aiming the scanner 1120 with a beam of the generated light directed at the scan target, and for illuminating the scan target with the directed light. The detector component 1232 is operable for sensing a reflection from the scan target. The sensed reflection comprises a portion of the directed light with which the scan target is illuminated. The detector 1232 is also operable for detecting information in the sensed reflection, in which the information detected in sensed reflection corresponds to the graphic data gathered from the scan target.

Example embodiments of the present invention comprise a subtractive aimer 1121 (FIG. 11), which filters a portion of the light used for illuminating the scan target. The subtractive aimer 1121 comprises a colored or patterned filter, which may be translucent or have another characteristic of at least partial less than full transparency.

Thus, as the scan target is illuminated generally for imaging, the filtered portion of the light beam casts a shadow over a portion of the scan target. The shadow conforms to the filter color and/or pattern of the subtractive aimer 21 and when cast over the portion of the scan target, allows the light beam to be directed for aiming the scanner 1130. While the shadow provides for aiming the scanner 1130, the unfiltered remainder of the light beam suffices to illuminate the scan target effectively.

The subtractive filter 1121 thus comprises a passive optical filter device operable for filtering a portion of the light emitted by the single illumination source. The passive optical filter device may comprise a chromatic pattern and/or a partially non-transparent pattern disposed, deployed, or inserted within a beam path of the generated light.

The passive optical filter device may be disposed or deployed within a light pipe 1122 (FIG. 11) through which the beam is projected or conducted. The passive optical filter device is operable for casting a shadow, within the directed light, over a portion of the scan target. The aiming of the scanner 1120 at the scan target comprises positioning the scanner 1120 such that cast shadow is placed over the scan target portion.

An example embodiment may be implemented in which the single, unitary illumination source 1125 comprises a LD or LED, which is operable for emitting the generated light. The detector 1232 component comprises a photosensor or photosensitive array of active optoelectronic devices. The photosensor may comprise CCD, CMOS, PD, CID, CMD, PMOS and/or NMOS devices.

The scanner 1120 further comprises the two passive optical lens devices. The illumination lens 1126 is operable for collimating, projecting, or focusing the beam of the generated light in relation to the aiming of the scanner 1120 and the illumination of the scan target. The imaging lens 1224 is operable for gathering or collecting the reflection, in which the gathered or collected reflection is focused onto a light sensing portion of the detector.

Figure 13:
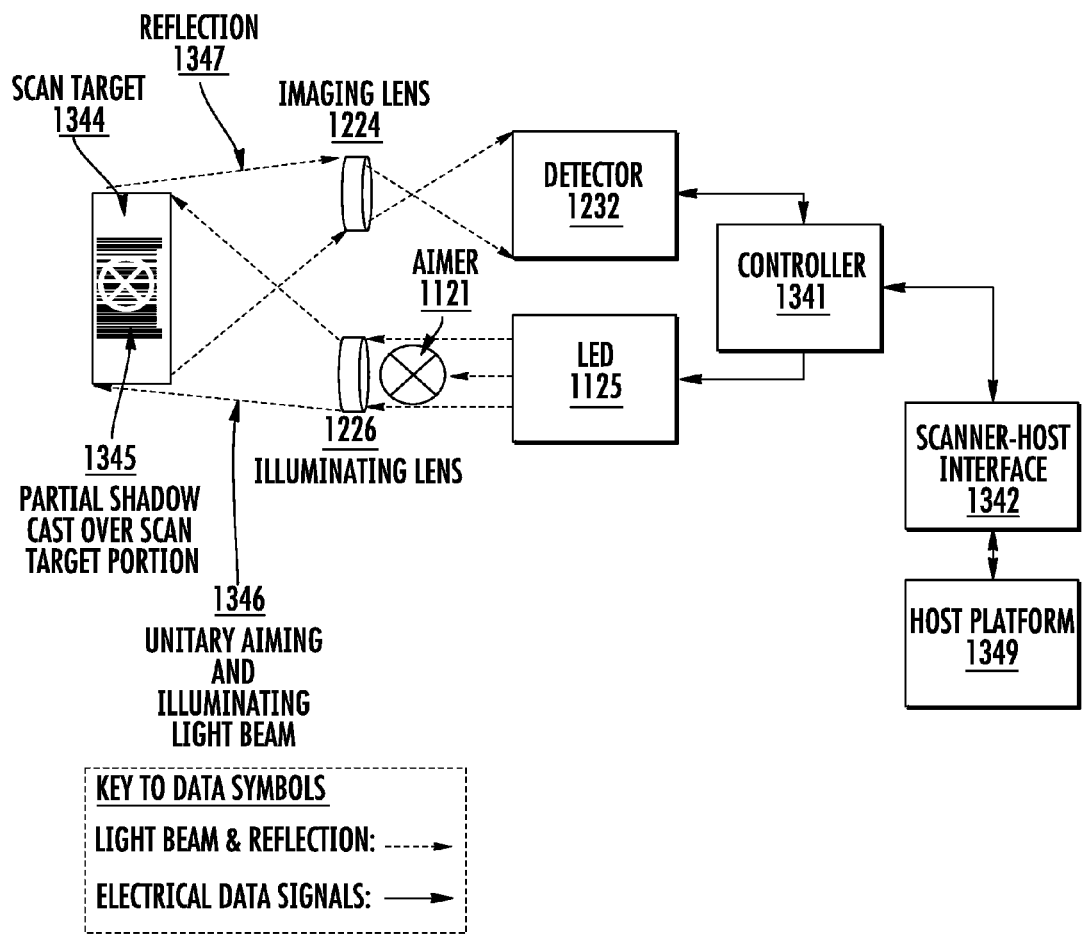
FIG. 13 depicts an example data flow in the image scanner with the single, unitary light source, according to an embodiment of the present invention.

FIG. 13 depicts an example data flow 1340 in the image scanner 1120 with the LED 1125 as its single, unitary light source, according to an embodiment of the present invention. Light emitted by the LED 1125 is operable for aiming the imager and for illuminating a scan target 1344, such as a bar code pattern. The aimer 1121 is disposed, positioned, or deployed within a beam path of the generated light between the emissive surface of the LED 1125 and the illuminating lens 1126. The aimer 1121 comprises a passive optical filter device, such as a colored pattern operable as a chromatic band pass filter and/or a partially non-transparent (e.g., translucent or other than fully transparent) or opaque pattern.

A single, unitary aiming and illuminating beam of the generated light is projected by the illuminating lens at the scan target 1344. The aimer 1121 filters out a portion of the light emitted by the LED 1125, such that the projected light beam 1346 casts a shadow 1345 over a portion of the scan target 1344. The shadow 1345 cast over the portion of the scan target 1344 conforms to the pattern of the aimer 1121. The scanner 1120 is aimed by its positioning in accordance with a desired placement of the shadow 1345 cast over the portion of the scan target 1344 and the unfiltered remainder of the light beam 1346 illuminates the scan target. A reflection 1347 of the light from the surface of the scan target 1344 is gathered by the imaging lens 1224.

The reflected light gathered by the imaging lens 1224 is focused over a photosensitive surface of the detector 1232. The detector component 1232 is operable for sensing the reflection 1347 from the surface of the scan target 1344. The sensed reflection gathered by the imaging lens 1224 comprises a portion of the directed light with which the scan target 1344 is illuminated. The detector 1232 is also operable for detecting information in the sensed reflection, in which the information detected in sensed reflection corresponds to the graphic data gathered from the scan target.

The scanner 1120 may be implemented to comprise a controller component (controller) 1341 operable for processing, at least partially, the graphic data in the reflection 1347 gathered from the scan target 1344 by the imaging lens 1224. The controller 1341 may comprise a microcontroller, microprocessor or another integrated circuit (IC) device, such as a field-programmable gate array (FPGA) or other programmable logic device (PLD) or an ASIC.

The controller 1341 is also operable for energizing the LED 1125, so as to aim the light projected from the illuminating lens 1126 at the scan target, which is illuminated therewith. The controller 1341 is also operable for deenergizing the light source 1125 upon completion of the imaging of the scan target, which conserves power and readies the scanner 1120 for subsequent scanning. Further, the controller 1341 is operable to exchange data signals with the detector 1232. The scanner 1120 may be incorporated into a host platform 1349, which may comprise a mobile device.

The scanner 1120 may thus also comprise an interface 1342 operable for coupling the scanner 1120 communicatively with the host platform 1349. The host platform 1349 is operable for sending command signals, via the interface 1342, to the control component 1341 in relation to the initiation and completion of scans by the scanner 1130. For example, the host platform 1349 may command the controller 1341 to energize and deenergize the light source 1125, commence sensing operations by the detector 1232, and more generally, to initiate and terminate scanning operations.

The initiation of the scanning operations may comprise triggering a scan upon receipt of a manual 'scan' command input by an input component associated with the host platform 1349, which may also allow selecting for automatic scan operations. For example, setting the scanner 1120 for automatic scanning allows the automatic initiation of scanning operations upon the detection of an available scan target within range, e.g., by a camera or video feature associated with the host platform 1349.

The controller 1341 may also function as a reader operable for processing, at least in part, the information detected in the reflection 1347 gathered by the imaging lens 24 and sensed by the detector 1232. The information processed by the controller 1341 comprises the graphic data gathered from the scan target. The communicative coupling of the scanner 1120 to the host platform 1349, via the interface 1342, allows the host platform to control the scanner 1120 in relation to the gathering of the graphic data from the scan target.

Further, the host platform 1349 is operable for receiving data signals from the scanner 1120 in relation to the information read from the sensed reflection by the detector 1232 and at least partly processed by the controller 1341. The host platform 1349 is thus also operable to perform additional processing over the graphic data gathered from the scan target. The additional processing of the graphic data gathered from the scan target may be used in relation to a variety of applications, generating additional data related to the various applications, and sharing these data with one or more other computers over a data network.

The scan target 1349 may comprise, for example, 1D bar codes, such as EAN/UPC patterns and/or PDF417 patterns, which comprise patterns of four (4) vertical bar like symbols disposed over 17 horizontal spaces. The scan target may also comprise 2D bar code patterns, such as Han Xin Code patterns and/or Quick-Response (QR) code patterns. Dot code patterns and other geometric pattern arrays may also be scanned, as well as various other kinds and styles of graphic information, images, symbols, indicia, pictographs, optical character recognition (OCR) data, and other visual data.

Figure 14:
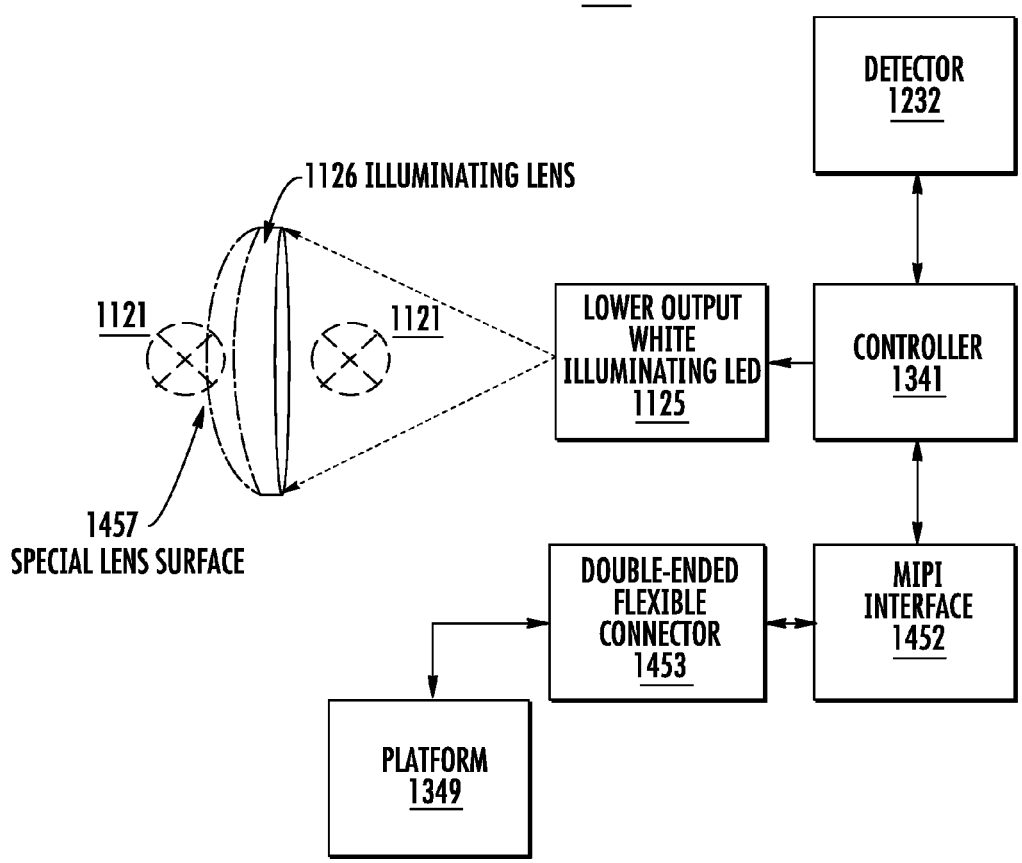
FIG. 14 depicts another example implementation of an imager scanner with a single, unitary light source, according to an embodiment of the present invention.

FIG. 14 depicts another example implementation 1450 of an imager scanner with a single, unitary light source, according to an embodiment of the present invention. The scanner implementation 1450 may be implemented with significant additional reduction in form factors associated therewith. For example, specialized components used in the implementation 50 allow fabrication of the scanner 1120 with a significant decrease in its thickness (e.g., to 4.0 mm or less).

In the present example scanner implementation 1450, the illumination lens 1126 is fabricated with a specialized surface 1457. In an example embodiment, the aimer 1121 is disposed, deployed, deposited within, on or proximate to specialized surface 1457 of the lens 1126. Additionally or alternatively, the aimer 1121 may also be disposed, deployed, or incorporated, at least partially, between the illuminating lens 1126 and the light source 1125.

The single, unitary light source 1125 comprises an LED, which emits white light over a broad visible spectrum and may be implemented with a somewhat lower intensity. In addition to the LED 1125 promoting thin form factors, its lower emission intensity consumes less electrical energy from the host platform 1349.

In the present scanner implementation 1450, the controller 1341 is operable for exchanging data signals with the detector 1232 and with the host platform 1349 via a Mobile Industry Processor Interface (MIPI) interface 1452 and a double-sided flexible connector 1453.

Example Scanning Process.

Figure 15:
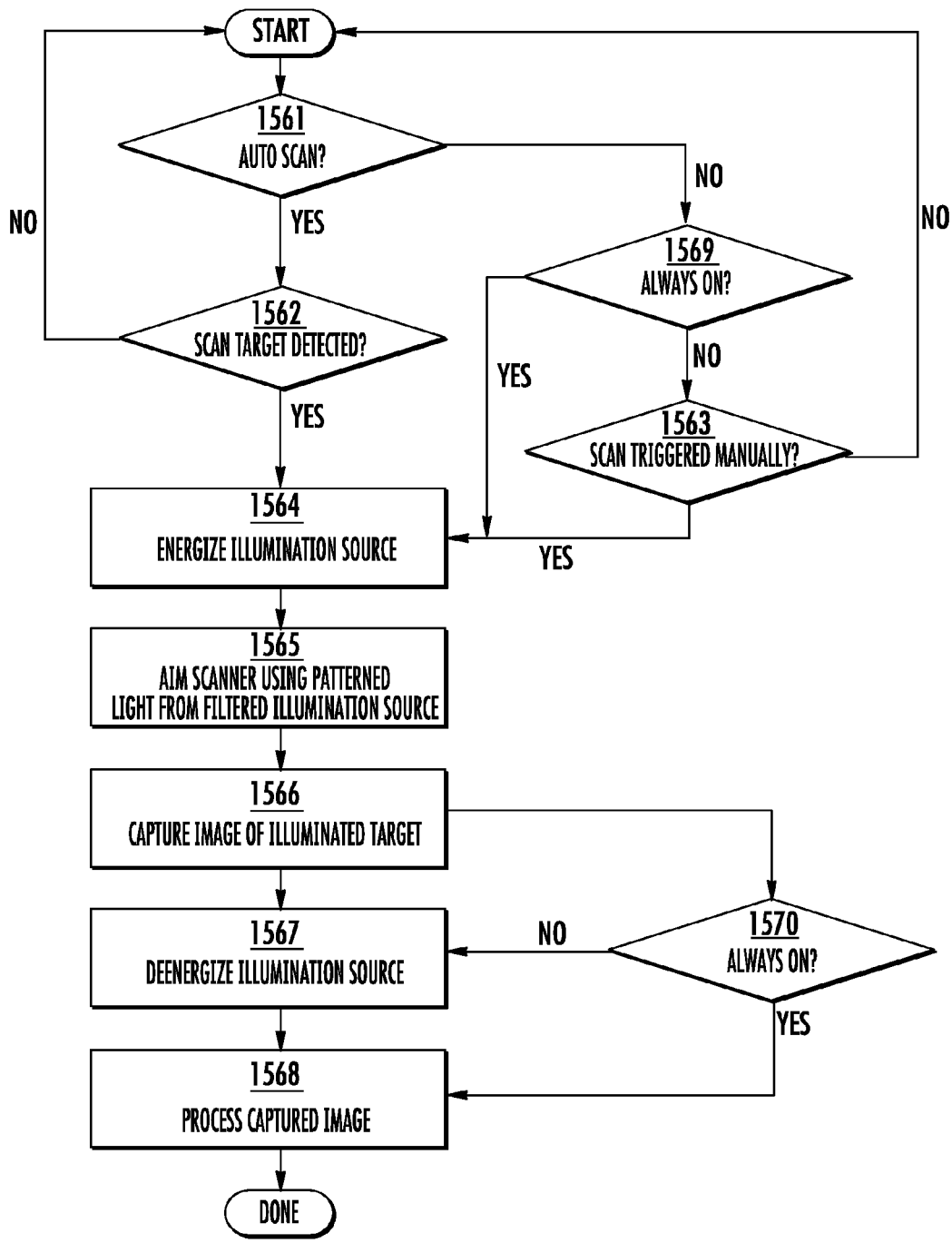
FIG. 15 depicts a flowchart for an example process for imaging a scan target with a single, unitary light source, according to an embodiment of the present invention.

FIG. 15 depicts a flowchart for an example process 1560 for imaging a scan target with a single, unitary light source, according to an embodiment of the present invention. The process 1560 commences with a step 1561, in which it is determined whether automatic scanning is enabled.

If automatic scanning is enabled, then in step 1562, it is determined whether a scan target is detected, or whether a scan is being triggered by another automatic scan commencing stimulus. If no scan target is detected, then in step 1569, it is determined whether the scanner is in an 'always on' state, in which the scanner is perpetually or continuously ready to perform a scan. For example, some classes, types, or implementations of scanners may remain connected to a power source and energized, e.g., selectively or by default, at an installation such as a 'point of sale' (POS) at which scans are performed herewith. Such scanners may thus be considered as always on. If so, then the process 1500 proceeds to step 1564.

If it is determined that the scanner is not always on, then in step 1563, it is determined whether a scan is being triggered by receipt of a manual (user initiated) 'initiate scan' command input. If no 'scan' command is received, then the process 1560 loops back to the start and/or awaits a command, such as to commence a scan or change to an operating mode of automatic scanning.

However, if a scan target or other automatic scan initiator is detected (in step 1562), or if an 'initiate scan' command is received (in step 1563), then a scan commences in 1564. The scan commences with energizing a single, unitary light source operable both for aiming the scanner and for illuminating the scan target.

In step 1565, the scanner is aimed at the scan target using light patterned by a filtering of the light from the single illumination source. An example embodiment of the present invention thus relates to a method for gathering graphic data from a scan target. In an example embodiment, light from a single illumination source is generated and a beam of the generated light filtered to modify a portion thereof.

The modified portion of the filtered light beam is aimed at the scan target, such that the beam of the generated light is directed to the scan target, which is illuminated generally therewith. The modified light beam portion comprises a pattern imparted by the filtering and cast as at least a partial shadow conforming to the pattern.

The aiming of the scanner step comprises directing the at least partial shadow over a portion of the scan target. The aiming the scanner step may comprise focusing the beam of the generated light in relation to the aiming step and the scan target is illuminated generally therewith. The aiming may also (or alternatively) comprise moving the scan target to a point at which a partial shadow corresponding to the aiming pattern coincides with the target.

In step 1566, an image of the illuminated scan target is captured based on light reflected from a surface of the scan target, gathered by an imaging lens and focused on a photosensitive detector. An example embodiment of the present invention thus also relates to sensing a reflection from the scan target.

The sensed reflection comprises a portion of the directed light with which the scan target is illuminated. Information corresponding to the graphic data gathered from the scan target is detected in the sensed reflection. The sensing of the reflection step may comprise collecting the reflection, in which the collected reflection is focused onto a light detector.

Upon capturing the image of the scan target, it is determined again in step 1570 whether the scanner is to remain in an 'always on' state at this point. If not, then the light source, which provided both aiming and illumination, is deenergized in step 1567. If it is determined however that the scanner is to remain always on, then the process 1500 proceeds to step 1568.

In step 1568, the information detected in the sensed reflection is processed, e.g., at least partially by the scanner (e.g., 1120; FIG. 11-FIG. 14, inclusive & FIG. 16) and/or by the host computer (e.g., host 1349; FIG. 13-FIG. 14, inclusive & FIG. 16). The processed information comprises the graphic data gathered from the scan target.

The method may also comprise controlling the scanner system, from a host platform, in relation to the gathering of the graphic data from the scan target, and providing the processed information read from the sensed reflection to the host platform.

An example embodiment may relate to a non-transitory computer readable storage medium comprising instructions, which are operable when executing on a processor of a computer system for causing and/or controlling a scanning process (e.g., in relation to the method 1560, as described above). The processor may comprise a component of a scanner and/or a host computer imager. The host computer may comprise a mobile device. The processor and/or the scanner may comprise a component of a mobile device or another host computer system.

Example Host Computer and Network.

Figure 16:
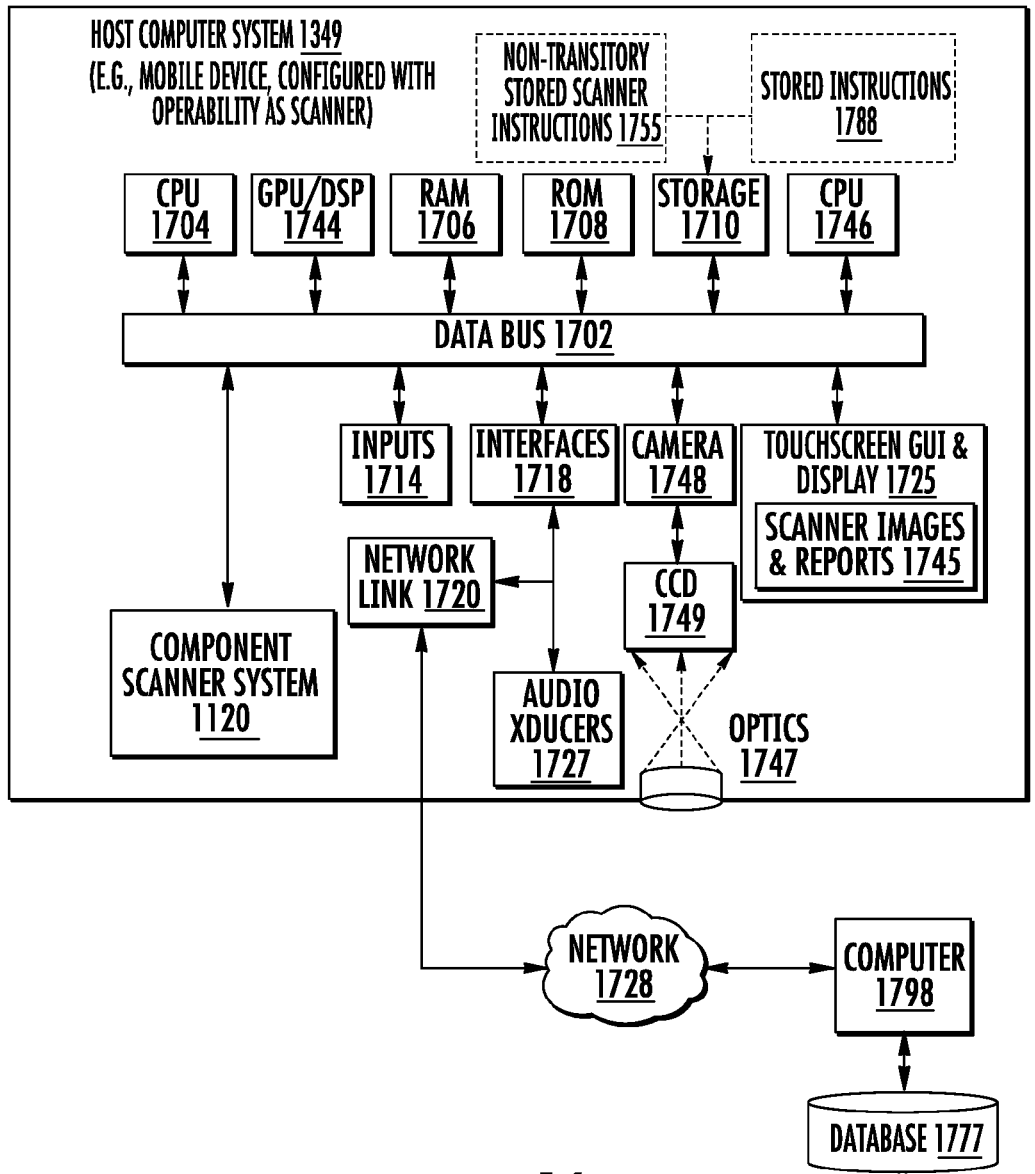
FIG. 16 depicts an example computer network, according to an embodiment of the present invention.

FIG. 16 depicts an example computer network 1700, according to an embodiment of the present invention. An example embodiment of the present invention relates a mobile device operable within the computer network 1700. In an example embodiment, the mobile device comprises the host computer 1349 for the scanner system 1120, which is operable as a component thereof. Notwithstanding a thin (or other small dimensional) form factor that may characterize the platform provided therewith, the mobile device (or other host computer) 1349 is thus configured with full scanner operability.

The scanner 1120 component is operable for gathering graphic data from a scan target 1344 (FIG. 13). The scanner 1120 component comprises a single illumination source 1125 (FIG. 11-FIG. 14, inclusive) and a photosensitive detector 1232 (FIG. 12-FIG. 14, inclusive). The single illumination source 1125 is operable for generating light, for aiming a scan using a beam of the generated light directed at the scan target 1344, and for illuminating the scan target with the directed light. The detector 1232 is operable for sensing a reflection from the scan target 1344. The sensed reflection comprises a portion of the directed light with which the scan target 1344 is illuminated. The detector 1232 is also operable for detecting information in the sensed reflection, in which the information detected in sensed reflection corresponds to the graphic data gathered from the scan target 1344.

The host computer 1349 is operable as a component for processing the graphic data, gathered by the implementation 1230 of the scanner 1120, from the scan target 1344. The host computer 1439 is also operable for performing at least one other processing function, which is substantially independent from the processing of the gathered graphic data. For example, the host computer 1349 may comprise a mobile device hosting the scanner component 1230, which is disposed, deployed, incorporated, installed, or fabricated therein. The scanner component 1230 comprises at least one element (e.g., interface 1342; FIG. 13) operable for communicatively coupling the scanner component to the host computer 1349 for the exchange of data therewith. The scanner component 1230 allows the mobile device to perform imaging related functionality, such as bar code scanning.

The computer network 1700 comprises a data network 1728, and the host computer 1349, which comprises a first computer system coupled communicatively to the data network 1728. At least a second computer 1798 may also be coupled communicatively to the data network 1728.

The host computer 1349 is configured operably (e.g., by software code with which it is programmed) to function as an imager and scanner. The host computer 1349 may comprise a mobile device such as a smart phone or other mobile telephone, tablet or laptop computer, PDA, PDT and/or another mobile or portable computing apparatus. Thus, the host computer 1349 is operable for performing one or more functions in addition to the imager and scanner function(s). For example, the host computer is operable to perform telephone, communication, and networking related functions.

While comprising mobility related characteristics such as portability features, the host computer 1349 may be deployed, disposed and operated in a stationary or near-stationary position, and/or at a fixed location, which may be disposed in proximity to a site associated with a logistics, storage or transport related portal. The storage or transport portal may be associated with a logistic, commercial, industrial, agricultural, military, laboratory (e.g., certification) setting or another facility.

The host computer 1349 is operable for communicating with other devices, such as the at least one computer 1798. The host computer 1349 is coupled communicatively via the network 1728 with the computer 1798. The network 1728 may comprise a packet-switched data network operable based on transfer control and internetworking protocols (e.g., TCP/IP).

The data network 1728 may comprise a portion of one or more other networks and/or two or more sub-network ("subnet") components. For example, the data network 728 may comprise a portion of the internet and/or a particular wide area network (WAN). The network 1728 may also comprise one or more WAN and/or local area network (LAN) subnet components. Portions of the data network 1728 may be operable wirelessly, such as by radiotelephone and Wireless Fidelity (Wi-Fi), and/or with wireline related means. The data network 728 may also comprise, at least in part, a digital telephone network.

While the at least second computer ("computer") 1798 may also comprise another mobile device, the computer 1798 may alternatively or additionally comprise another computer (e.g., server, PC, workstation, mainframe) and be located at a particular location, where it may be disposed in a more or less fixed, or at least stationary or near-stationary position or configuration. In relation to the host computer 1349, the computer 1798 may also be operable as a server and/or for performing one or more functions relating to control or centralized pooling, processing or storage of information gathered or accessed therewith, e.g., with a database 1777.

For example, embodiments of the present invention may be implemented in which the host computer 1349 is operable for sending reports 1745 relating to data corresponding to the processing of captured images, e.g., related to data gathered from scan targets such as bar codes and/or other graphic information, to the computer 1798 over the network 1728. The computer 1798 may then store the image related data in the database 1777, from which it may be retrieved at a later time. The data retrieved from the database 1777 may be used in processing other (e.g., subsequent) images and/or other (e.g., logistic) applications.

The host computer 1349 may also be operable for capturing images photographically (including recording video) and/or scanning and reading bar codes and other data patterns and other data presented by graphic media. The host computer 1349 may also comprise a component 7146, which is operable for scanning radio frequency identification (RFID) tags and processing data associated therewith.

The images and data associated with the bar code and/or RFID tags may be sent to the computer 1798. In addition to capturing and processing images, the host computer 1349 may also use scanned bar codes and other data patterns (and RFIDs) for reading data (e.g., inventory information, price, etc.) therefrom in relation to associated items (e.g., packages, stock, products, commodities, parts, components, etc.).

The host computer 1349 may then send the image processing report 745, data relating thereto, and/or the scan related data to the computer 798 over the network 1728 wirelessly, via the network 1728, to the computer 1798.

Upon receipt thereof, the computer 1798 may be operable for further processing the data related to the images and the scan related data. The scan data may relate to the data gathered from bar codes and other graphic media. For example, the scan data may relate to the captured images, measurements associated therewith, and/or identities or other information related to items associated with scan targets.

The scan data may relate to commercial transactions relating to the transport and/or storage of an item. The scan data may also relate to a sale, transfer or other disposition of the item and associated with the bar code or other data pattern (or RFID tags). The processing of the data may thus allow, for example, updating the database 1777 in relation to inventory, tracking shipments, etc.) based on the image processing and other aspects of the item associated with the scan target and the bar codes (or RFID tags) thereof.

The scan data may relate to commercial transactions relating to the transport and/or storage of an item. The scan data may also relate to a sale, transfer or other disposition of the item and associated with the bar code or RFID tag. The processing of the data may thus allow, for example, updating the database 1777 in relation to inventory, tracking shipments, etc.) based on the image evaluation and other aspects of the item associated with the scanned surface features and the bar codes (or RFID tags).

The host computer 1249 comprises a plurality of electronic components, each of which is coupled to a data bus 1702. The data bus 1702 is operable for allowing each of the multiple, various electronic components of the host computer to exchange data signals conductively with each of the other electronic components thereof.

The electronic components of the host computer 1349 may comprise IC devices, including one or more microprocessors. The electronic components of the host computer 1349 may also comprise other IC devices, such as a microcontroller, FPGA or other PLD or ASIC.

The microprocessors include a central processing unit (CPU) 1704. The CPU 1704 is operable for performing general data processing functions related to operations of the host computer 1349. The electronic components of the host computer 1349 may also comprise one or more other processors 1744. The other microprocessors may also include a graphic processing unit (GPU) and/or digital signal processor (DSP) 1704, which are each operable for performing data processing functions that may be somewhat more specialized than the general processing functions, as well as sometimes sharing some of the general processing functions with the CPU 1704.

One of the processors 1744 may also be operable as a "math" (mathematics) coprocessor. The math co-processor, DSP and/or GPU ("DSP/GPU") 1744 are operable for performing computationally intense data processing. The computationally intense processing relates to reading bar codes and other data patterns, imaging, image evaluation, graphics, dimensioning, wireframe manipulations, coordinate system management, mapping in relation to the coordinate system, logistics, and other (e.g., mathematical, financial) information.

The data processing operations comprise computations performed electronically by the CPU 1704 and the DSP/GPU 1744. For example, the microprocessors may comprise components operable as an arithmetic logic unit (ALU), a floating point logic unit (FPU), and associated memory cells. The memory cells comprise non-transitory data storage media, which may be configured as caches (e.g., "L1," "L2"), registers, latches and/or buffers, etc. The memory cells are operable for storing data electronically in relation to various functions of the processor. For example, a translational look-aside buffer (TLB) may be operable for optimizing efficiency of use of content-addressable memory (CAM) by the CPU 1704 and/or the DSP/GPU 1744.

The host computer 1349 also comprises non-transitory computer readable storage media operable for storing data, e.g., electronically. For example, the host computer 1349 comprises a main memory 1706, such as a random access memory (RAM) or other dynamic storage device 1706. The main memory 1706 is coupled to data bus 1702 for storing information and instructions, which are to be executed by the CPU 1704. The main memory 1706 also may be used for storing temporary variables or other intermediate information during execution of instructions by the CPU 1704. Other memories (represented in the present description with reference to the RAM 1706) may be installed for similar uses by the DSP/GPU 1744.

The host computer 1349 further comprises a read-only memory (ROM) 1708 or other static storage device coupled to the data bus 1702. The ROM 1708 is operable for storing static information and instructions for use by the CPU 1704. In addition to the RAM 1706 and the ROM 1708, the non-transitory storage media of the host computer 1349 may comprise at least one data storage device 710. The data storage device 1710 is operable for storing information and instructions and allowing access thereto.

The data storage device 1710 may comprise a flash drive, optical drive, or magnetic (e.g., "disk") drive. The optical drive may be operable for reading from, and sometimes writing to, optical storage media. The optical media may comprise, e.g., compact disks (CDs), digital versatile (or "video") disks (DVDs), and/or Blu-Ray Disks (BDs). The data storage device 1710 comprises non-transitory media coupled to data bus 1702, and may be operable for providing a "virtual memory" function. The virtual memory operations of the storage device 1710 may supplement, at least temporarily, storage capacity of other non-transitory media, such as the RAM 1706.

The non-transitory storage media of the host computer 1349 also comprises instructions ("imager instructions") 1755, which is stored (e.g., electronically, optically, magnetically, physically, etc.) in relation to software for programming, controlling, and/or configuring its operations relating to the imaging (scanning) of scan targets and the processing of scanned images and computing features of items associated with scan targets. The non-transitory imager instructions 1755 may also (or alternatively) be stored in association with the storage 1710 and other storage components of the host computer 1349.

Non-transitory programming instructions, software, settings and configurations related to operations of the scanner system component 1120 are stored (e.g., electronically, optically, magnetically, physically, etc.) by a dedicated memory, flash, or drive related non-transitory storage medium 1755 and/or with the non-transitory storage medium 1710. The non-transitory storage medium 710 may also store a suite 1788 of instructions, which relate to a suite of other functional features with which the host computer 1349 may also be also operable, e.g., for performing other functional features.

An example embodiment may be implemented in which the suite 1788 of features relates to applications, tools and tool sets, menus (and sub-menus) and macros associated with functions of host computer 1349 related to capturing and processing images. The suite 1788 may also relate to scanning and reading bar code patterns and RFID tags, taking photographs, recording video and/or audio information, telephonic operations, and capturing other data related to images and presentations of graphic media and other information sources.

The host computer 1349 comprises a user-interactive touchscreen 725, which is operable as a combined graphical user interface (GUI) and display component 1725. The touchscreen 725 may comprise a liquid crystal display (LCD), which is operable for rendering images by modulating variable polarization states of an array of liquid crystal transistor components. The touchscreen 1725 also comprises an interface operable for receiving haptic inputs from a user.

The haptic interface of the GUI touchscreen 1725 may comprise, e.g., at least two arrays of microscopic (or transparent) conductors, each of which is insulated electrically from the other and disposed beneath a surface of the display 1725 in a perpendicular orientation relative to the other. The haptic inputs comprise pressure applied to the surface of the touchscreen GUI 1725, which cause corresponding local changes in electrical capacitance values proximate to the pressure application that are sensed by the conductor grids to effectuate a signal corresponding to the input. Other haptic and GUI (e.g., resistive, piezoelectric, ultrasonic, etc.) technologies may also be used.

In an example embodiment, the touchscreen GUI and display component 1725 is operable for rendering graphical reports 1745 in relation to image processing. The image processing reports 1745 are rendered by the display 1725 upon receipt of data related to the processing and evaluation images of from the CPU 704 and/or the GPU/DSP 1744.

The touchscreen GUI component 7125 may be implemented operably for rendering images over a heightened (e.g., high) dynamic range (HDR), the rendering of the images may also be based on modulating a back-light unit (BLU). For example, the BLU may comprise an array of light emitting diodes (LEDs). The LCDs may be modulated according to a first signal and the LEDs of the BLU may be modulated according to a second signal. The touchscreen 1725 may render an HDR image by coordinating the second modulation signal in real time, relative to the first modulation signal. Other display technologies may also be used.

A plurality of inputs 1714 may comprise one or more electromechanical switches, which may be implemented as buttons, escutcheons, or cursor controls. The inputs 1714 may also comprise a keyboard. The keyboard may comprise an array of alphanumeric (and/or ideographic, syllabary based) keys operable for typing letters, number, and other symbols. The keyboard may also comprise an array of directional (e.g., "up/down," "left/right") keys, operable for communicating commands and data selections to the CPU 1704 and for controlling movement of a cursor rendering over the touchscreen GUI display 1725.

The directional keys may be operable for presenting two (2) degrees of freedom of a cursor, over at least two (2) perpendicularly disposed axes presented on the display component of the touchscreen GUI 1725. A first 'x' axis is disposed horizontally. A second 'y' axis, complimentary to the first axis, is disposed vertically. Thus, the host computer 1349 is thus operable for specifying positions over a representation of a geometric plane and/or other coordinate systems.

Audio transducers ("Xducers") 1727 have a microphone function and a speaker function. The microphone function is operable for transducing speech and other sound into corresponding electrical signals, which may be accessed via an interface 718 and processed by one or more of the electronic components of the host computer 1349. The speaker function is operable for transducing audibly signals accessed via the interface 1718, which were generated by the electronic components. The audio transducers and associated interface 714 thus allow the host computer 1349 to function telephonically and in response to audio user commands.

The host computer 1349 may comprise an implementation of the example scanner 1120, and is thus operable therewith for scanning visual data such as bar codes and other data patterns and/or other images presented on printed graphic media and/or self-lit electronic displays. Example embodiments of the present invention also relate to the use of the host computer 1349 for taking photographs and recording video. A camera component 1748 is coupled to the data bus 1702. The camera component 1748 is operable for receiving data related to the scanned bar code patterns.

The camera component 1748 is also operable for receiving static and dynamic image data related, respectively, to the photographs and the video. The camera component 748 may receive the data captured from an image sensor 1749, or from the scanner 1120. The image sensor 1749 may comprise an array of CCDs, PDs, CMOS, PMOS, NMOS, CID and/or CMD based imaging devices. The image sensor 749 may be operable with a system of optical components ("optics") 1747. The optics 1747 may be associated with the passive optical imaging lens component 1224 of the scanner 1120. The image processing instructions 1755 and the bar code scanning (and other) feature(s) of the mobile device 1049 are operable with the scanner 1120 and may also be operable with one or more of the camera component 1748, the image sensor component 1749, and/or the optics 1747. An example embodiment may be implemented in which the camera 1748, the image sensor 1749, and/or the optics 1747 share one or more components with the scanner 1120.

The electronic components of the host computer 1349 may also comprise an RFID scanner 1746 coupled to the data bus 1702. The RFID scanner 1746 is operable for scanning RFID tags.

Execution of instruction sequences contained in the main memory 1706 causes the CPU 1704 to perform process steps associated with operations of the host computer 1349 and the scanner component 1120. One or more microprocessors are operable for executing instructions contained in main memory 1706. Additionally and/or alternatively, hard-wired circuitry may be used in place of, or in combination with the software instructions. Thus, the host computer 1349 is not limited to any specific combination of circuitry, hardware, firmware, and/or software.

The term "computer readable storage medium," as used herein, may refer to any non-transitory storage medium that participates in providing instructions to the CPU 1704 (and the DSP/GPU 1744) for execution. Such a medium may take many forms, including but not limited to, non-volatile media, volatile media, and transmission media. Non-volatile media comprises, for example, configured/programmed active elements of the CPU 1704, the DSP/GPU 1744, the non-transitory stored dimensioner instructions 755 and other optical, electronic, or magnetic disks, such as storage device 1710. Volatile media comprises dynamic memory associated, e.g., with the RAM 706.

Transmission media comprises coaxial cables, copper wire and other electrical conductors and fiber optics, including the wires (and/or other conductors or optics) that comprise the data bus 1702.

Transmission media can also take the form of electromagnetic radiation (e.g., light waves), such as may be generated at radio frequencies (RF), and infrared (IR) and other optical frequencies. Data communications may also be effectuated using other means, including acoustic (e.g., sound related) or other mechanical, vibrational, or phonon related media.

Non-transitory computer-readable storage media may comprise, for example, flash drives such as may be accessible via USB or any medium from which a computer can read data.

Various forms of non-transitory computer readable storage media may be involved in carrying one or more sequences of one or more instructions to CPU 1704 for execution. For example, the instructions may initially be carried on a magnetic or other disk of a remote computer (e.g., computer 1798). The remote computer can load the instructions into its dynamic memory and send the instructions over the network 1728.

The host computer 1349 can receive the data over the network 1728 and use an IR, RF or other transmitter means to convert the data to corresponding signals. An IR, RF or other signal detector or receiver ("receiver") coupled to the data bus 702 can receive the data carried in the corresponding signals and place the data on data bus 1702. The operations associated with the transmitter and the receiver may be combined in a transmitter/receiver (transceiver) means. The transmitter, receiver, and/or transceiver means may be associated with the interfaces 1718.

The data bus 1702 carries the data to main memory 1706, from which CPU 1704 and the DSP/GPU 1744 retrieve and execute the instructions. The instructions received by main memory 1706 may optionally be stored on storage device 1710 either before or after execution by CPU 1704.

The interfaces 1718 may comprise a communication interface coupled to the data bus 1702. In addition to interfacing audio signals between the data bus 1702 and the audio transducers 1727, the communication interface is also operable for providing a two-way (or more) data communication coupling to a network link 1720, which may connect wirelessly at radio frequencies (RF) to the network 1728. Wireless communication may also be implemented optically, e.g., at IR frequencies.

In any implementation, the communication interface 1718 sends and receives electrical, electromagnetic, or optical signals that carry digital data streams representing various types of information. The network link 1720 provides data communication through the network 1728 to other data devices. The communication interfaces 1718 may also provide audio signals to the speaker 1727.

The network 1728 may use one or more of electrical, electromagnetic, and/or optical signals carrying digital data streams. The signals sent over the network 1728 and through the network link 1720 and communication interface 1718 carry the digital data to and from the host computer 1349. The host computer 1349 can send messages and receive data, including program code, through the network 1728, network link 1720, and communication interface 1718.

Embodiments of the present invention may thus increase the general availability of efficient and fully effective reading of bar codes and other data patterns, and other imaging applications economically and over a wide scale and spectrum. The increase in the general availability of bar code reading and other imaging is implemented with an addition these features to widely available mobile devices, which may also feature thin form factors. The bar code readers and other specialized imagers are incorporated into the mobile devices effectively and economically, and without adding to their thickness.

In an example embodiment of the present invention, a scanner system is operable for gathering graphic data from a scan target. The scanner system comprises a single illumination source component and a detector component. The single illumination source is operable for generating light, for aiming the scanner system with a beam of the generated light directed at the scan target, and for illuminating the scan target with the directed light. The detector component is operable for sensing a reflection from the scan target, the sensed reflection comprising a portion of the directed light with which the scan target is illuminated, and for detecting information in the sensed reflection, in which the information detected in sensed reflection corresponds to the graphic data gathered from the scan target.

Thus, example embodiments combine an aiming functionality directly into illumination source optics of the imager and eliminate a separate additional light source for aiming. In addition to reducing costs associated therewith, eliminating separate aimer light sources reduces space occupied by the imagers and allows their incorporation into thin form factor mobile devices with no increased thickness.

Example embodiments of the present invention comprise a subtractive aimer, which filter a portion of the light used for illuminating the bar code or other item to be scanned. As used herein, the term "scan target" refers to the bar codes and other data patterns, graphic medium or other item to be scanned by the imager. The subtractive aimer comprises a colored or patterned filter, which may be translucent, opaque, or have another characteristic of at least partial less than full transparency.

Thus, as the scan target is illuminated generally for imaging, the filtered portion of the light beam casts a shadow over a portion of the scan target. The shadow conforms to the filter color and/or pattern of the subtractive aimer and when cast over the portion of the scan target, allows the light beam to be directed for aiming the scanner. While the shadow provides for aiming the scanner, the unfiltered remainder of the light beam suffices to illuminate the scan target effectively.

The subtractive filter thus comprises a passive optical filter device operable for filtering a portion of the light emitted by the single illumination source. The passive optical filter device may comprise a chromatic pattern and/or a partially non-transparent pattern. An example embodiment may be implemented in which the passive optical filter device is disposed, deployed, or inserted within a beam path of the generated light.

For example, the passive optical filter device may be disposed or deployed within a light pipe through which the beam is projected or conducted. The passive optical filter device and is operable for casting a shadow, within the directed light, over a portion of the scan target. The aiming of the scanner system at the scan target comprises positioning the scanner system such that cast shadow is placed over the scan target portion.

An example embodiment may be implemented in which the single illumination source comprises at least one active optoelectronic device, such as a LD or a LED, which is operable for emitting the generated light. The detector component may comprise at least one active photosensor.

The photosensor may comprise a CCD, CMOS, PD, CID, CMD, PMOS, or NMOS device, or an array of the devices. The devices of the array may comprise a plurality of the CCD, CMOS, PD, CID, CMD, PMOS), or NMOS devices.

An example embodiment may be implemented in which the scanner system further comprises one or more passive optical lens devices. At least a first lens is operable for focusing the beam of the generated light in relation to the aiming of the scanner system and the illumination of the scan target. A second lens may be operable for collecting the reflection, in which the collected reflection is focused onto a light sensing portion of the detector.

The scan target may comprise 1D and/or 2D data patterns and/or other graphic data, symbols, geometric patterns, pictographs, indicia, or visible items. Example embodiments of the present invention may be incorporated into a host mobile device, including smart phones, tablet and laptop computers, mobile telephones, PDAs, or PDTs. The scanner may thus further comprise an interface operable for coupling the scanner system communicatively to the host computer platform.

The scanner may also comprise a reader operable for processing the information detected in the sensed reflection, in which the processed information comprises the graphic data gathered from the scan target. The communicative coupling of the scanner system to the host platform may comprise controlling the scanner system in relation to the gathering of the graphic data from the scan target, and to providing the processed information read from the sensed reflection to the host platform.

An example embodiment of the present invention relates to a method for gathering graphic data from a scan target. In an example embodiment, light from the single illumination source is generated and a beam of the generated light filtered to modify a portion thereof. The modified portion of the filtered light beam is aimed at the scan target, such that the beam of the generated light is directed to the scan target, which is illuminated generally therewith.

A reflection from the scan target is sensed. The sensed reflection comprises a portion of the directed light with which the scan target is illuminated. Information corresponding to the graphic data gathered from the scan target is detected in the sensed reflection.

The modified light beam portion comprises a pattern imparted by the filtering and cast as at least a partial shadow conforming to the pattern. The aiming of the scanner step comprises directing the at least partial shadow over a portion of the scan target.

The aiming the scanner step may comprise focusing the beam of the generated light in relation to the aiming step and the scan target is illuminated generally therewith.

The sensing the reflection step may comprise collecting the reflection, in which the collected reflection is focused onto a light detector. The method may also comprise processing the information detected in the sensed reflection, in which the processed information comprises the graphic data gathered from the scan target.

The method may also comprise controlling the scanner system, from a host platform, in relation to the gathering of the graphic data from the scan target, and providing the processed information read from the sensed reflection to the host platform.

An example embodiment may relate to a non-transitory computer readable storage medium comprising instructions, which are operable when executing on a processor of a computer system for causing and/or controlling a scanning process (e.g., in relation to the method, as described above). The processor may comprise a component of an imager (e.g., as described above). The processor may comprise a component of a mobile device or another host computer system.

An example embodiment of the present invention relates to a mobile device. In an example embodiment, the mobile device comprises the scanner system component and the host mobile device computer component operable therewith.

The scanner component is operable for gathering graphic data from a scan target. The scanner component comprises a single illumination source and a photosensitive detector. The single illumination source is operable for generating light, for aiming a scan using a beam of the generated light directed at the scan target, and for illuminating the scan target with the directed light. The detector is operable for sensing a reflection from the scan target. The sensed reflection comprises a portion of the directed light with which the scan target is illuminated. The detector is also operable for detecting information in the sensed reflection, in which the information detected in sensed reflection corresponds to the graphic data gathered from the scan target.

The computer system component is operable for processing the graphic data gathered from the scan target. The computer system component is also operable for performing at least one other processing function, which is substantially independent from the processing of the gathered graphic data. For example, the computer system component may comprise a mobile device hosting the scanner component, which is disposed, deployed, or incorporated therein. The scanner component allows the mobile device to perform imaging related functionality, such as bar code scanning.

In an example embodiment, the mobile device comprises a "computerized" or computer related apparatus (computer). The computer comprises a data and a processor coupled to the bus. The computer also comprises a non-transitory storage medium component (e.g., memory, drives) coupled to the bus. The non-transitory storage medium comprises instructions, which are stored tangibly (physically, e.g., electronically, optically, electromagnetically). The stored instructions are operable, when executing on the processor, for causing and/or controlling the scanner component to perform a process for gathering graphic data from scan targets.

\* \* \*

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;

U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;

U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;

U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);
U.S. patent application Ser. No. 14/578,627 for SAFETY SYSTEM AND METHOD filed Dec. 22, 2014 (Ackley et al.);
U.S. patent application Ser. No. 14/580,262 for MEDIA GATE FOR THERMAL TRANSFER PRINTERS filed Dec. 23, 2014 (Bowles);
U.S. patent application Ser. No. 14/590,024 for SHELVING AND PACKAGE LOCATING SYSTEMS FOR DELIVERY VEHICLES filed Jan. 6, 2015 (Payne);
U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

Example embodiments of the present invention have thus been described. Example embodiments are described in relation to aiming imagers. A scanner system is operable for gathering graphic data from a scan target. The scanner system comprises a single illumination source component and a detector component. The single illumination source is operable for generating light, for aiming the scanner system with a beam of the generated light directed at the scan target, and for illuminating the scan target with the directed light. The detector component is operable for sensing a reflection from the scan target, the sensed reflection comprising a portion of the directed light with which the scan target is illuminated, and for detecting information in the sensed reflection, in which the information detected in sensed reflection corresponds to the graphic data gathered from the scan target.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are unnecessary for describing example embodiments of the invention, and not particularly relevant to understanding of significant features, functions and aspects of the example embodiments described herein.

In the specification and/or figures, typical embodiments of the invention have been disclosed. The present invention is not limited to such example embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed, is:

1. A scanner system operable for gathering graphic data from a scan target, the scanner system comprising:
   a single illumination source component operable for generating light, for aiming the scanner system wherein a beam of the generated light is directed at the scan target, and for illuminating the scan target with the directed light, wherein the single illumination source component comprises:
      at least one active optoelectronic device operable for emitting the generated light, and
      a passive optical filter device operable for filtering a portion of the emitted light subtractively for aiming the scanner system; and
   a detector component operable for sensing a reflection from the scan target wherein the sensed reflection comprises a portion of the directed light with which the scan target is illuminated, and for detecting information in the sensed reflection, and wherein the information detected in sensed reflection corresponds to the graphic data gathered from the scan target.

2. The scanner system as described in claim 1 wherein the at least one active optoelectronic device comprises a laser diode (LD) or a light emitting diode (LED).

3. The scanner system as described in claim 1 wherein the passive optical filter device comprises at least one of a chromatic pattern, or a subtractive or partially non-transparent pattern, which is disposed or deployed within a beam path of the generated light and is operable for casting at least a partial a shadow, within the directed light, over a portion of the scan target, wherein the aiming of the scanner system at the scan target comprises positioning the scanner system such that cast at least partial shadow is placed over the scan target portion.

4. The scanner system as described in claim 1, further comprising:
at least a first passive optical lens device operable for focusing the beam of the generated light in relation to the aiming of the scanner system and the illumination of the scan target.

5. The scanner system as described in claim 4, further comprising:
a second passive optical lens device operable for collecting the reflection wherein the collected reflection is focused onto a light sensing portion of the detector component.

6. The scanner system as described in claim 1, further comprising:
a reader component operable for processing the information detected in the sensed reflection wherein the processed information comprises the graphic data gathered from the scan target.

7. The scanner system as described in claim 6, further comprising:
an interface component operable for coupling the scanner system to a host platform communicatively.

8. The scanner system as described in claim 7 wherein the communicative coupling of the scanner system to the host platform comprises:
controlling the scanner system in relation to the gathering of the graphic data from the scan target; and
providing the processed information read from the sensed reflection to the host platform.

9. The scanner system as described in claim 7 wherein the host platform comprises a mobile computing device in which the scanner system is disposed or deployed.

10. The scanner system as described in claim 9 wherein the mobile computing device comprises at least one of a smart phone, a tablet computer, a laptop computer, a mobile telephone, a portable or personal data or digital assistant (PDA), or a portable data terminal (PDT).

11. The scanner system as described in claim 1 wherein the scan target comprises one or more of a one-dimensional (1D) bar code pattern or a two-dimensional (2D) bar code pattern.

12. The scanner system as described in claim 1 wherein the detector component comprises at least one of a charge coupled device (CCD), a complementary metal oxide semiconductor (CMOS) device, a photodiode (PD) based device, a charge-injection device (CID), a charge modulation device (CMD), a P-channel metal oxide semiconductor field effect transistor (PMOS) device, an N-channel metal oxide semiconductor field effect transistor (NMOS) device, or an array of devices, the devices of the array comprising two or more of at least one of the CCD, CMOS, PD, CID, CMD, PMOS, or NMOS devices.

13. A method for gathering graphic data from a scan target, the method comprising the steps of:
generating light from a single illumination source, wherein a beam of the generated light is filtered subtractively to modify a portion thereof;
aiming the modified portion of the filtered light beam at the scan target wherein the beam of the generated light is directed to the scan target, which is illuminated generally therewith; and
sensing a reflection from the scan target wherein the sensed reflection comprises a portion of the directed light with which the scan target is illuminated, wherein information is detected in the sensed reflection, and wherein the information detected in the sensed reflection corresponds to the graphic data gathered from the scan target.

14. The method as described in claim 13 wherein the modified light beam portion comprises a pattern imparted by the filtering and cast as at least a partial shadow conforming to the pattern and wherein the aiming step comprises directing the at least partial shadow over a portion of the scan target.

15. The method as described in claim 13 wherein the aiming step comprises focusing the beam of the generated light in relation to the aiming step and the general illumination of the scan target.

16. The method as described in claim 13 wherein the sensing step comprises collecting the reflection wherein the collected reflection is focused onto a light detector.

17. The method as described in claim 13, further comprising processing the information detected in the sensed reflection wherein the processed information comprises the graphic data gathered from the scan target.

18. The method as described in claim 17, further comprising:
controlling the scanner system, from a host platform, in relation to the gathering of the graphic data from the scan target; and
providing the processed information read from the sensed reflection to the host platform.

19. A mobile device operable for gathering graphic data from scan targets comprising graphic media, the mobile device comprising:
a computer system operable for processing the graphic data gathered from the scan target, and for performing at least one processing function substantially independent from the processing of the gathered graphic data; and
a scanner system coupled to the computer system, and comprising:
a single illumination source operable for generating light, for aiming the scanner system wherein a beam of the generated light is directed at the scan target, and for illuminating the scan target with the directed light, wherein the single illumination source component comprises:
at least one active optoelectronic device operable for emitting the generated light, and
a passive optical filter device operable for filtering a portion of the emitted light subtractively for aiming the scanner system;
a detector operable for sensing a reflection from the scan target wherein the sensed reflection comprises a portion of the directed light with which the scan target is illuminated, and for detecting information in the sensed reflection, and wherein the information detected in the sensed reflection corresponds to the graphic data gathered from the scan target; and at least one component operable for providing the graphic data gathered from the scan target to the computer system.

\* \* \* \* \*